United States Patent
Bier et al.

(10) Patent No.: US 9,854,867 B2
(45) Date of Patent: Jan. 2, 2018

(54) SHOE, SOLE ASSEMBLY FOR A SHOE, METHOD FOR MANUFACTURING A SOLE ASSEMBLY, AND METHOD FOR MANUFACTURING A SHOE

(71) Applicants: W. L. Gore & Associates, GmbH, Putzbrunn (DE); W. L. Gore & Associates Scandinavia AB, Mölndal (SE); Ecco Sko A/S, Bredebro (DK)

(72) Inventors: Christian Bier, Miesbach (DE); Stane Nabernik, Kranj (SI); Thorger Hübner, Flintsbach (DE); Tore Strömfors, Lindome (SE); Frank Jensen, Bredebro (DK); Jakob Møller Hansen, Aabenraa (DK)

(73) Assignees: W. L. Gore & Associates GmbH, Putzbrunn (DE); W. L. Gore & Associates Scandinavia AB, Mölndal (SE); ECCO Sko A/S, Bredebro (DK)

( * ) Notice: Subject to any disclaimer, the term of this patent is extended or adjusted under 35 U.S.C. 154(b) by 0 days.

(21) Appl. No.: 14/843,503

(22) Filed: Sep. 2, 2015

(65) Prior Publication Data
US 2016/0007675 A1   Jan. 14, 2016

Related U.S. Application Data

(63) Continuation of application No. 13/820,008, filed as application No. PCT/EP2010/062977 on Sep. 3, 2010, now Pat. No. 9,138,028.

(51) Int. Cl.
A43B 7/06      (2006.01)
A43B 7/08      (2006.01)
(Continued)

(52) U.S. Cl.
CPC .............. *A43B 7/06* (2013.01); *A43B 7/08* (2013.01); *A43B 7/088* (2013.01); *A43B 7/125* (2013.01);
(Continued)

(58) Field of Classification Search
CPC .. A43B 7/06; A43B 7/08; A43B 7/081; A43B 7/082; A43B 23/02; A43B 23/0205
(Continued)

(56) References Cited

U.S. PATENT DOCUMENTS 2,098,412 A  *  11/1937  Everett .................... A43B 7/06
                                                          36/3 R
3,953,566 A       4/1976  Gore
(Continued)

FOREIGN PATENT DOCUMENTS

| CN | 1350814 | 5/2002 |
| CN | 1910033 | 2/2007 |

(Continued)

*Primary Examiner* — Marie Bays
(74) *Attorney, Agent, or Firm* — Kilpatrick Townsend & Stockton, LLP

(57) ABSTRACT

A shoe according to the invention comprises an upper assembly comprising an upper portion (10) having an outer material (11) for surrounding a foot and a lower portion (20) having at least a breathable layer (21). The shoe also comprises a sole comprising a ventilating container element (113) having a bottom part (103) and a side wall (102) surrounding said bottom part (103) so as to form an inner space of the ventilating container element (113), the ventilating container element being arranged below and attached to the upper assembly, and a filler structure or material (61; 62; 63; 64; 65; 112) allowing for air flow through it placed in the inner space of the ventilating container element (113).

53 Claims, 8 Drawing Sheets

(51) Int. Cl.
*A43B 23/02* (2006.01)
*A43B 7/12* (2006.01)
*A43B 13/12* (2006.01)
*B29D 35/08* (2010.01)
*B29K 75/00* (2006.01)

(52) U.S. Cl.
CPC .......... *A43B 13/12* (2013.01); *A43B 23/0205* (2013.01); *B29D 35/081* (2013.01); *B29K 2075/00* (2013.01)

(58) Field of Classification Search
USPC ............................................ 36/3 R, 3 A, 3 B
See application file for complete search history.

(56) References Cited

U.S. PATENT DOCUMENTS

| | | | |
|---|---|---|---|
| 4,187,390 A | 2/1980 | Gore | |
| 4,194,041 A | 3/1980 | Gore | |
| 4,493,870 A | 1/1985 | Vrouenraets et al. | |
| 4,610,099 A * | 9/1986 | Signori | A43B 13/203 36/28 |
| 4,725,418 A | 2/1988 | Friemel et al. | |
| 5,329,807 A | 7/1994 | Sugar et al. | |
| 5,588,226 A * | 12/1996 | Schenkel | A43B 7/125 36/3 B |
| 5,746,012 A | 5/1998 | Caletti et al. | |
| 5,983,524 A | 11/1999 | Moretti | |
| 6,305,100 B1 * | 10/2001 | Komarnycky | A43B 7/08 36/27 |
| 6,389,711 B1 | 5/2002 | Moretti | |
| 6,502,330 B1 | 1/2003 | David et al. | |
| 6,560,902 B1 | 5/2003 | Eschweiler | |
| 6,655,048 B2 * | 12/2003 | Moretti | A43B 7/125 36/29 |
| 6,948,260 B2 * | 9/2005 | Lin | A43B 7/081 36/3 B |
| 6,976,319 B2 * | 12/2005 | Pfander | A43B 1/0009 36/3 B |
| 7,178,266 B2 * | 2/2007 | Deem | A43B 7/08 36/3 B |
| 7,340,850 B2 * | 3/2008 | Lin | A43B 7/082 36/29 |
| 7,503,130 B2 * | 3/2009 | Helton | A43B 5/08 36/3 B |
| 7,543,398 B2 * | 6/2009 | Hsaio | A43B 7/125 36/14 |
| 7,779,557 B2 | 8/2010 | Teteriatnikov et al. | |
| 7,823,297 B2 | 11/2010 | Moretti | |
| 8,245,416 B2 | 8/2012 | Polegato Moretti | |
| 2002/0100187 A1 | 8/2002 | Polegato | |
| 2002/0157278 A1 | 10/2002 | Moretti | |
| 2003/0150131 A1 | 8/2003 | McManus et al. | |
| 2004/0078996 A1 | 4/2004 | Brooks | |
| 2005/0138838 A1 | 6/2005 | Lin et al. | |
| 2006/0288612 A1 | 12/2006 | Lucas et al. | |
| 2007/0000148 A1 * | 1/2007 | Lin | A43B 7/082 36/3 B |
| 2007/0011907 A1 | 1/2007 | Polegato Moretti | |
| 2007/0028483 A1 | 2/2007 | Miyata | |
| 2007/0074424 A1 | 4/2007 | Lin | |
| 2007/0113359 A1 | 5/2007 | Moretti | |
| 2007/0186444 A1 * | 8/2007 | Hsiao | A43B 7/125 36/14 |
| 2008/0052956 A1 * | 3/2008 | Polegato Moretti | A43B 7/06 36/3 A |
| 2008/0066341 A1 | 3/2008 | Hottinger | |
| 2008/0066342 A1 | 3/2008 | Park | |
| 2008/0229623 A1 * | 9/2008 | Ferretti | A43B 7/082 36/3 B |
| 2009/0126230 A1 | 5/2009 | McDonald et al. | |
| 2009/0172971 A1 | 7/2009 | Peikert et al. | |
| 2009/0199438 A1 | 8/2009 | Moretti | |
| 2009/0211119 A1 * | 8/2009 | Moretti | A43B 7/06 36/3 B |
| 2009/0293306 A1 * | 12/2009 | Sedelmeier | A43B 7/081 36/88 |
| 2009/0300942 A1 | 12/2009 | Peikert | |
| 2009/0307925 A1 | 12/2009 | Pfister | |
| 2010/0083534 A1 | 4/2010 | Howlett | |
| 2010/0122475 A1 | 5/2010 | Purrington et al. | |
| 2010/0126041 A1 | 5/2010 | Francis | |
| 2010/0132228 A1 * | 6/2010 | Polegato Moretti | A43B 7/125 36/3 B |
| 2010/0218399 A1 | 9/2010 | Jeong | |
| 2011/0162240 A1 * | 7/2011 | Pieri | A43B 7/082 36/3 B |
| 2011/0167679 A1 * | 7/2011 | Graziani | A43B 7/081 36/3 R |
| 2011/0179677 A1 | 7/2011 | Jessiman et al. | |
| 2012/0297644 A1 * | 11/2012 | Polegato Moretti | A43B 7/08 36/84 |
| 2013/0232826 A1 * | 9/2013 | Bier | A43B 7/087 36/3 B |

FOREIGN PATENT DOCUMENTS

| | | | |
|---|---|---|---|
| CN | 1993065 | 7/2007 | |
| CN | 101060796 | 10/2007 | |
| CN | 101484032 | 7/2009 | |
| EP | 0728424 A2 | 8/1996 | |
| EP | 2294936 | 9/2010 | |
| IT | WO 2010032275 A2 * | 3/2010 | ............ A43B 7/081 |
| JP | Hei03-069404 U | 7/1991 | |
| JP | 3023584 U | 2/1996 | |
| JP | 3109001 U | 3/2005 | |
| RU | 2118501 | 9/1998 | |
| RU | EA200601352 | 12/2006 | |
| WO | WO-98/51177 A2 | 11/1998 | |
| WO | WO99/26504 | 6/1999 | |
| WO | WO-2005/011417 A2 | 7/2005 | |
| WO | WO2005/063609 | 7/2005 | |
| WO | WO2008/003375 | 1/2008 | |
| WO | WO2011/045210 | 4/2011 | |

* cited by examiner

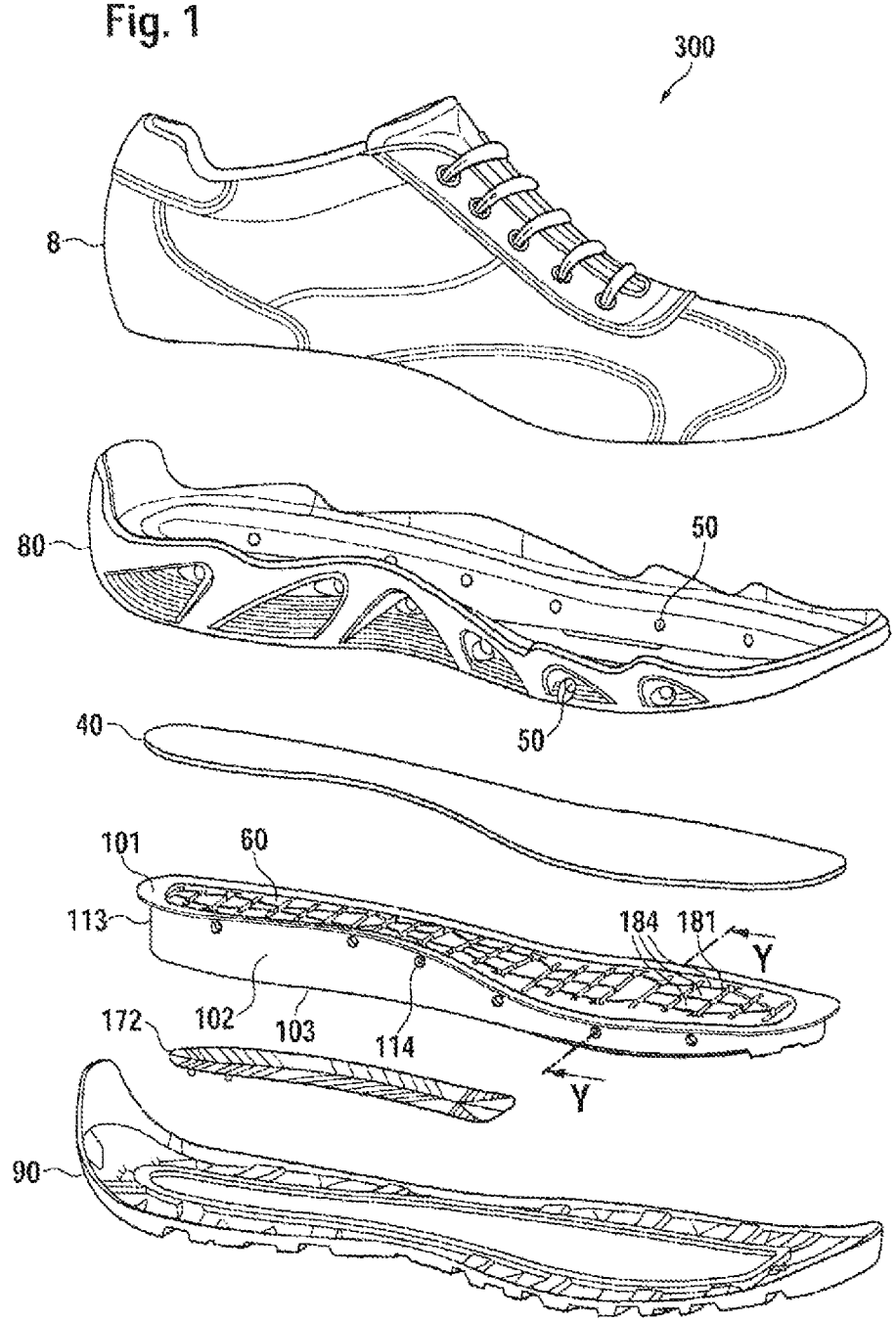

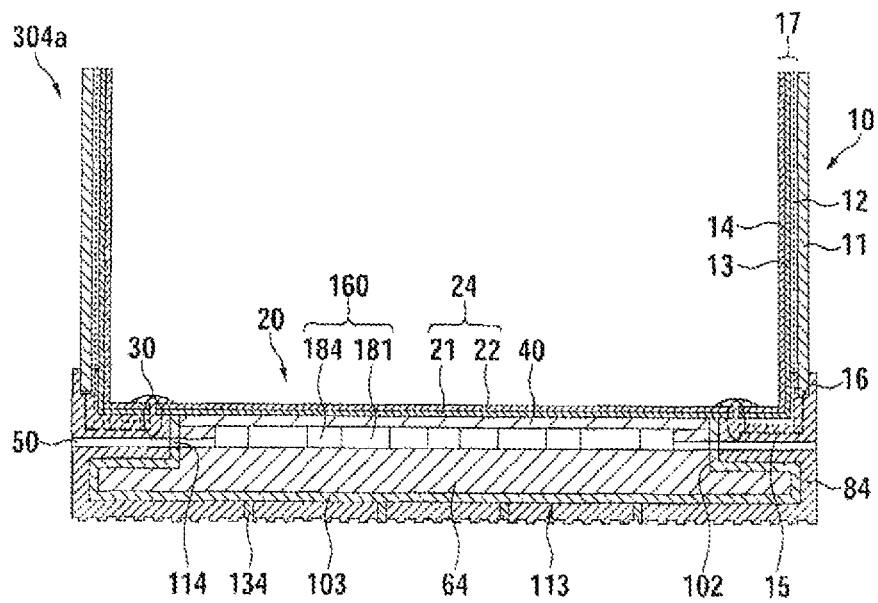
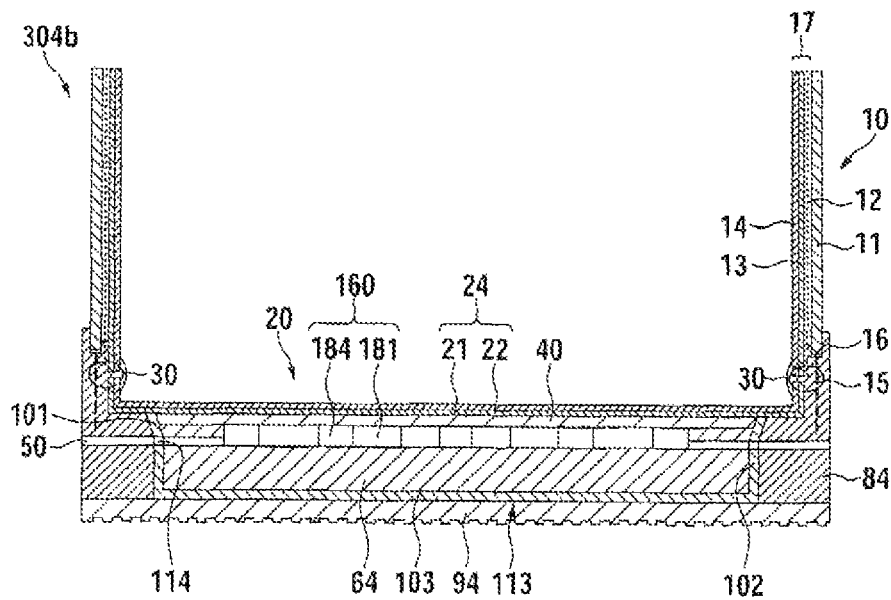

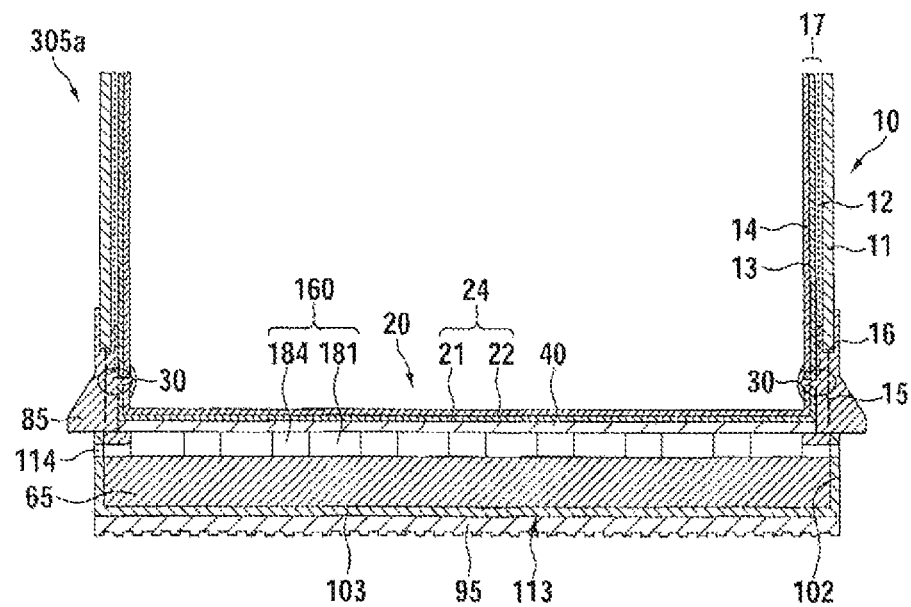
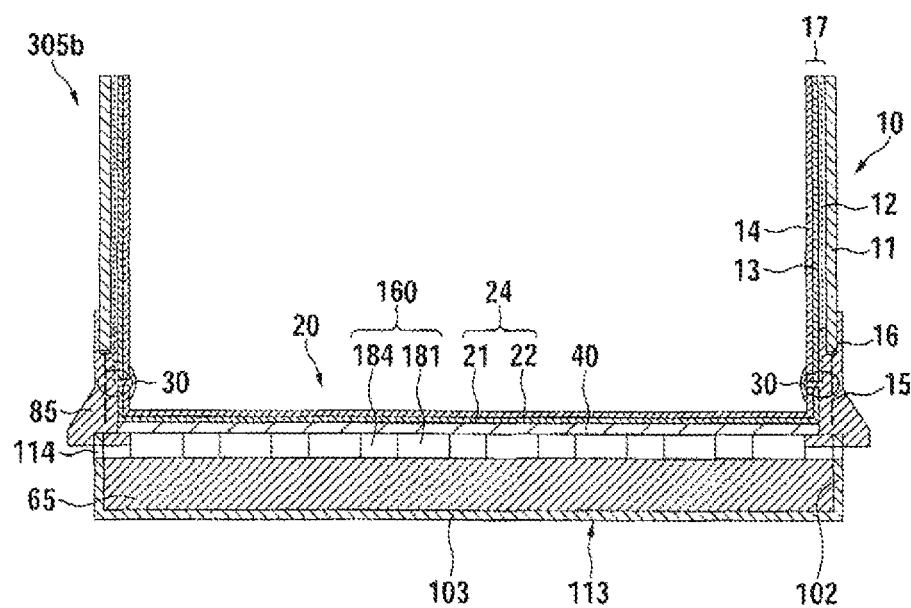

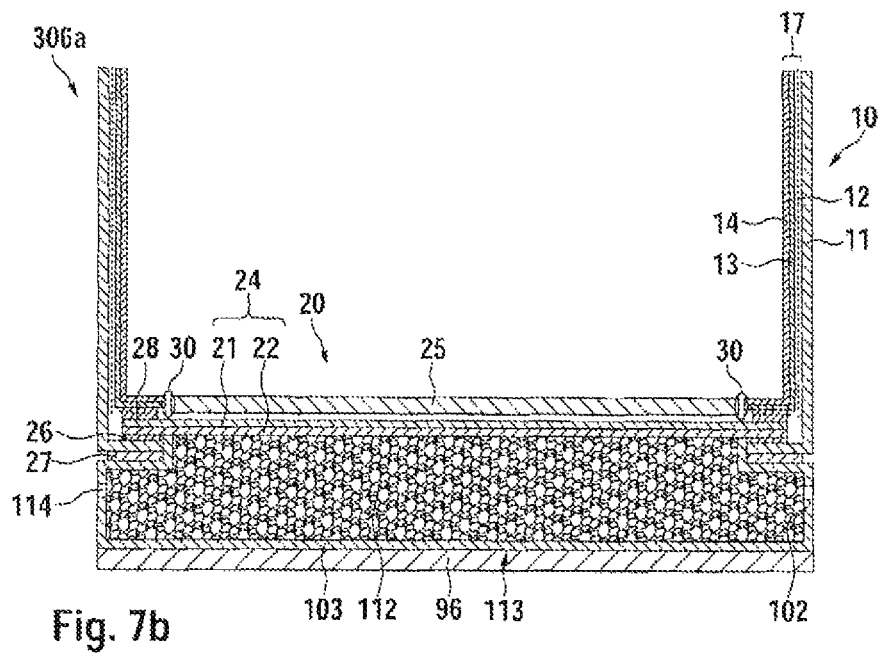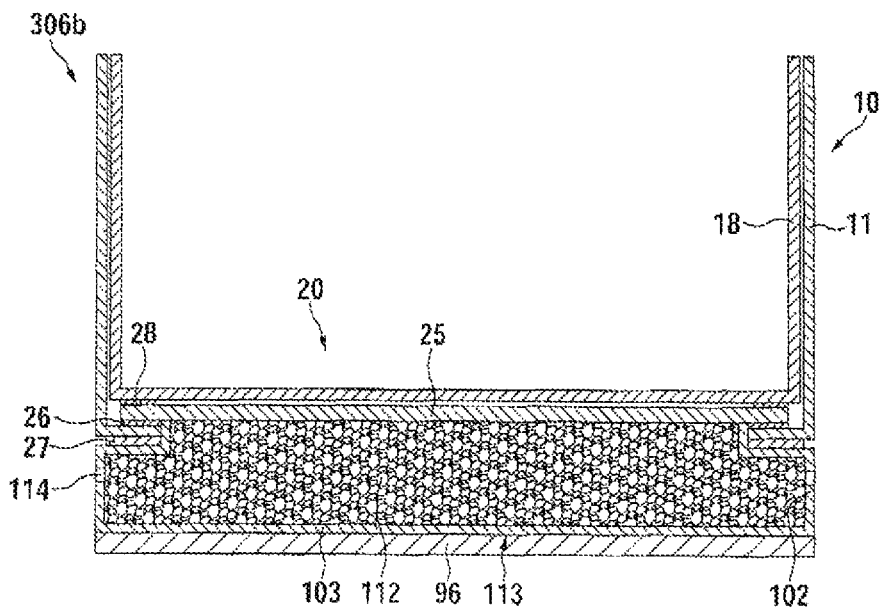

SHOE, SOLE ASSEMBLY FOR A SHOE, METHOD FOR MANUFACTURING A SOLE ASSEMBLY, AND METHOD FOR MANUFACTURING A SHOE

The invention is directed to a shoe, to a sole assembly for a shoe, and to a semi-manufactured product for a shoe. It is also directed to a method for manufacturing a sole assembly and to a method for manufacturing a shoe.

It is known in the art to equip shoes with breathable soles or breathable upper assemblies. Breathable soles allow for transfer of water vapour from the inside of the shoe through the sole to an outside of the sole. However, with modern shoes having complex 3-dimensional structures that are engineered for user comfort, cushioning, fashion aspects, etc., it has been found to be difficult to allow for an efficient provision of breathable shoes with prior art approaches.

It is therefore an object of the invention to provide a shoe with excellent breathability characteristics whose structure allows for reliably achieving the breathable characteristics during manufacture. It is also an object of the invention to provide a breathable shoe that allows for variable manufacturing methods. In this context, it is also an object of the invention to provide semi-manufactured products for a shoe, such as a sole assembly, that allow for a simplified manufacturing of a breathable shoe having the excellent breathability characteristics.

According to a first aspect of the invention, there is provided a shoe according to the features of claim 1.

In particular, in an aspect of the invention, there is provided a shoe comprising an upper assembly comprising an upper portion having an outer material for surrounding a foot and a lower portion having at least a breathable layer; and a sole comprising a ventilating container element having a bottom part and a side wall surrounding said bottom part so as to form an inner space of the ventilating container element, the ventilating container element being arranged below and attached to the upper assembly; and a filler structure or material allowing for air flow through it placed in the inner space of the ventilating container element.

The shoe according to the invention allows for an effective transfer of water vapour from the inside of the shoe to the outside thereof. The filler structure or material, also referred to as filler herein, ensures that air can flow through it, and therefore facilitates water vapour discharge from the underside of the foot through the breathable layer of the lower portion of the upper assembly to the ventilating container element, through which the water vapour is led outwards. Accordingly, a high level of water vapour discharge is achieved, particularly because air flow can take place in the filler structure or material in a static environment, e.g. when sitting or standing. This flow may be enhanced by the movement of the shoe when the wearer is walking or running. Two favourable effects take place during a walking or running motion, each of which is predominantly associated with one of the two phases of the gait cycle, namely the actual stance phase and the shoe swinging phase in between the actual steps. During the shoe swinging phase, an air flow in and out of the ventilating container element and through the filler structure or material is generated. The bending of the shoe sole during the walking or running motion and additionally the application of the wearer's weight on the ventilating container element and the filler structure or material during the stance phase also forces air flow within the filler structure or material. The air pushed out of the ventilating container element takes water vapour from the inside of the shoe with it. The ambient air coming back into the ventilating container element can then be recharged with water vapour.

Besides, the ventilating container element helps with the manufacture of the shoe in a number of different ways. The ventilating container element is the pivot of the shoe in that it establishes a structure, to which further sole elements and the upper assembly may be attached. The ventilating container element ensures that various different embodiments of soles as well as upper assemblies can be combined to form the shoe. As long as their coupling structures are adapted to conform to the coupling structures of the ventilating container element, a multitude of various embodiments may be produced around the ventilating container element. The ventilating container element, including the filler structure or material, provides the breathable core of the lower portion of the shoe. Further sole elements may be added easily and with a minimum number of constraints. As long as the further sole elements allow for an air communication path between the ventilating container element and an outside of the shoe, a shoe with highly breathable characteristics may be easily manufactured. Also, the ventilating container element may form a substantial part or all of the sole of the shoe.

A further advantage is that the ventilating container element forms an inherently stable core structure for the shoe, which reduces the stability requirements of the filler structure or material as well as for further sole elements, into which the ventilating container element may be embedded, as well as the stability requirements for the upper assembly. Thus one or more further sole elements may for example be made of a material, which provides more traction on the ground, but less stability.

A yet further advantage is that the ventilating container element also provides for a well-defined inner space. Accordingly, many different filler structures or materials can be chosen or designed, which conform with the dimensions of the ventilating container element and which allow for air flow through them. Said different designs may comply with different shoe requirements, such as different stability or cushioning or ventilation, that is air flow requirements, and may be included into the breathable shoe without changing the remaining structure of the shoe. Consequently, a high flexibility in the manufacture is ensured by the provision of the ventilating container element as container for the filler structure or material allowing for air flow through it. The filler structure or materials may be discontinuous, thus being in need of a housing or container to hold them in. The ventilating container element further provides protection of the filler structure or material from outside influences, such as sharp protrusions. If the ventilating container element is surrounded by a further sole element which has been moulded onto the ventilating container element or else if the ventilating container element has been attached to the upper assembly of a shoe via a material which has been moulded onto the ventilating container element, then the ventilating container element can also serve to protect the filler structure or material from being penetrated by the moulded on material.

The lower portion of the upper assembly refers generally to a lower part of the structure that is arranged around the wearer's foot during use of the shoe. The association of particular shoe elements, such as the outer material, with the upper portion or the lower portion of the upper assembly is not intended to result in a definition of the extensions of the lower portion and the upper portion by the extensions of these particular elements. With the terms upper portion and lower portion referring to portions of the bag around the user's foot, lower portion is not necessarily understood as the lowermost element of the upper assembly.

The sole may be a completed entity or may be formed at the time of attachment to the upper assembly and/or to the ventilating container element, for example through injection-moulding.

The term breathable material refers to materials that are water vapour permeable. They may also be air permeable. In a particular embodiment, the breathable layer of the lower portion of the upper assembly is waterproof and breathable, but not air permeable. The breathable layer may be a membrane or functional layer, with these terms being used interchangeably herein.

The term ventilating container element is not intended to imply that the ventilating container element comprises an active, self-propelled mechanism for ventilating the shoe. Instead, the structure of the ventilating container element allows for an airing or ventilating of the ventilating container element and its inside in a static environment and also particularly due to the wearer's motion during use of the shoe. Accordingly, the ventilating container element may also be referred to as ventilated container element or ventilation container element. Is is explicitly pointed out, however, that the invention does not rule out that an active mechanism, such as a self-propelled pump or the like, is present in addition to the particular inventive structure.

The container element forms a tub for receiving the filler structure or material allowing for air flow through it. The dimensions of the filler structure or material may correspond substantially to the dimensions of the inner space of the ventilating container element. The filler structure or material may be placed in the ventilating container element without attachment, i.e. it may be laid loosely into the ventilating container element. It is also possible, however, that the filler structure or material is attached to the ventilating container element, for example via spot-wise gluing. The ventilating container element and the filler structure or material are originally separate entities that together form a breathable lower portion of a shoe allowing for air flow through it.

According to a further embodiment, the ventilating container element has, at least in a portion thereof, particularly at least in a top portion thereof, a smaller perimeter than the lower portion of the upper assembly. In a particular embodiment, the ventilating container element has, along its entire vertical extension, a smaller perimeter than the lower portion of the upper assembly. This structure allows for an efficient distribution of functions between the ventilating container element and the sole. The ventilating container element may be designed primarily around the requirements of breathability and air flow and possibly stability for the shoe, whereas a surrounding sole element arranged around the ventilating container element may be designed in accordance with the wear and tear requirements given for an outside of the shoe and/or also stability.

With the shoe being a three-dimensional object, the ventilating container element forms a three-dimensional container, which can also be viewed as a tub or a trough, which holds the filler structure or material. The side wall of the ventilating container element may substantially follow the outline of a wearer's sole when seen from the bottom, but may be somewhat smaller than the outline of the sole. However, the ventilating container element may also extend over a portion of the underside of the wearer's sole only. Depending on the particular requirements of a particular shoe, the bottom part as well as the side wall of the ventilating container element may be arranged at a non-constant height with respect to the ground. The side wall may also have a non-constant height extension along its perimeter. For example, the wearer's heel may be intended to be positioned higher than the wearer's forefoot, such that the side wall of the ventilating container element may have a larger height extension in a heel area than in a forefoot area.

According to a further embodiment, the ventilating container element is attached to the upper assembly by adhesive. In particular, the ventilating container element may be glued to the upper assembly. Alternatively, it is also possible that the ventilating container element is stitched to the upper assembly, particularly in a strobeled or zigzag fashion. In particular, the ventilating container element may be attached to the lower portion of the upper assembly only. Via gluing or stitching, a reliable attachment and fixation between the ventilating container element and the upper assembly is achieved. A semi-manufactured product is thus provided as a single piece for further manufacture which may be handled conveniently.

According to a further embodiment, the ventilating container element is attached to the upper assembly by a material moulded on parts of the upper assembly and the ventilating container element. The moulding may be injecting, also referred to as injection-moulding, or casting. The term moulding is intended to include the alternatives injecting, casting, etc. Also, whenever the term injection-moulding is used, casting is an equivalent alternative. It is apparent to a person skilled in the art that any of these and other forming methods may be used, depending on the particular requirements for the particular manufacturing operation. Via moulding, a strong attachment may be provided between the ventilating container element and the upper assembly, in particular between the ventilating container element and the lower portion of the upper assembly. Such moulding may also provide a seal between the lower portion of the upper assembly and the inside of the ventilating container element and/or may provide a seal between further components of the upper assembly, in particular between a bottom functional layer laminate and an upper functional layer laminate, as will be described later. A surrounding sole element may then be applied in a further moulding step without having to take measures to protect the water vapour permeable characteristics between the inside of the shoe and the inside of the ventilating container element. However, it is also possible to keep the elements of the upper assembly and the ventilating container element in a fixed position with respect to each other, either via gluing/stitching or via a pressured positioning in a mould, and to use a single moulding step in order to attach the surrounding sole element to the ventilating container element and to the upper assembly and to form the surrounding sole element at the same time.

According to a further embodiment, the ventilating container element further comprises a collar arranged in the vicinity of an upper circumferential edge of said ventilating container element. Preferably, said collar protrudes in a direction between and including upwards, that is vertical, and laterally outwards, that is horizontal, from said ventilating container element. According to a particular embodiment, the ventilating container element comprises a collar arranged at an upper end of the side wall and extending substantially laterally outwards from the side wall. The collar provides a means for attaching the ventilating container element to the upper assembly. Such attachment gives advantages during manufacturing of the shoe because the upper assembly and the ventilating container element are handled as a unit which is easily transported from one manufacturing station to the next inside the factory. Additionally/alternatively, the collar provides a barrier against surrounding sole material or against glue. In this way, said surrounding sole material may be kept to the desired locations, for example during injection-moulding of the surrounding sole element, or said glue may be kept from penetrating into the inside of the ventilating container element. The collar may be stitched to said lower portion of said upper assembly, particularly in a strobeled or zigzag fashion. The collar may also be glued or injected onto said lower portion of said upper assembly.

In a further embodiment, said ventilating container element comprises collar sections. These collar sections may be provided for a portion-wise attachment and/or sealing. The collar sections may be positioned on the ventilating container element as discussed above with regard to the collar. In a particular embodiment, said ventilating container element comprises a first collar section in the vicinity of an upper circumferential edge in a heel area and a second collar section in the vicinity of an upper circumferential edge in a forefoot area. Said first and second collar sections may extend vertically upwards from an upper surface of said ventilating container element.

According to a further embodiment, the upper assembly comprises a waterproof, breathable functional layer arrangement extending over the upper portion and the lower portion of the upper assembly. The functional layer arrangement may be comprised of one, two or more functional layer pieces, also referred to as membrane pieces. In case two or more membrane pieces are present, the membrane pieces are arranged side by side (potentially having some overlap), joined and sealed together to yield a waterproof, breathable functional layer arrangement. The functional layer arrangement is shaped substantially like the inner shape of the upper assembly surrounding the wearer's foot. The membrane pieces may each be laminated with one or more textile layers, such that the functional layer arrangement may be an arrangement of one, two or more functional layer laminates.

According to a particular embodiment, the upper portion of the upper assembly comprises a breathable outer material, joined with a waterproof, breathable upper functional layer laminate. In a particular embodiment, the lower portion of the upper assembly comprises a waterproof, breathable bottom functional layer laminate, which comprises said breathable layer, and a side end area of said bottom functional layer laminate and a lower end area of said upper functional layer laminate are joined to one another, with a waterproof seal being provided at the joint. The bottom functional layer laminate and the upper functional layer laminate form the waterproof, breathable functional layer arrangement. Such a waterproof, breathable upper assembly allows for an excellent protection against water entering the inner part of the shoe containing the foot, while ensuring high breathability through the upper as well as the through the ventilating container element. The waterproof upper assembly, comprised of the upper functional layer laminate and the bottom functional layer laminate, whose connection is sealed in a waterproof manner, ensures that no water enters the shoe from the outside, such that the wearer will not get wet feet any wet conditions, e.g. rainy, muddy or snowy environments. The upper assembly forms a waterproof bag around the wearer's foot, which allows for a 360° water protection for the wearer's foot, i.e. it completely surrounds the wearer's foot (with the exception of the shoe opening for receiving the wearer's foot, of course). Particularly, the waterproof, breathable upper functional layer laminate ensures that no water enters the shoe from the outside through the outer material. At the same time, it is ensured that the upper portion is breathable and therefore helps in transporting water vapour from the inside of the shoe to the outside. Water vapour can be effectively transferred out of the upper assembly both via the upper portion of the upper assembly as well as via the lower portion of the upper assembly through the ventilating container element. Accordingly, a high level of water vapour discharge is achieved.

According to a further embodiment, the side end area of said bottom functional layer laminate and the lower end area of said upper functional layer laminate are joined to one another via stitching.

In a particular embodiment, said waterproof seal is provided by a material moulded or injected onto the upper assembly at least in an area of the joint or wherein said waterproof seal is provided by glue applied for attaching the sole to the upper assembly or wherein said waterproof seal is provided by a seam tape. Each of these options for providing a waterproof seal and any combination of these options allows for a tight sealing between the two laminates and for the provision of an overall waterproof upper assembly. In a particular embodiment the injected material may be a sole material.

In a particular embodiment, the ventilating container element may be situated inside, in relation to the outer circumference of the shoe, the connection between the side end area of the bottom functional layer laminate and the lower end area of the upper functional layer laminate. In other words the ventilating container element is placed some distance away from the connection towards the middle of the shoe. This embodiment guarantees that injected or moulded on material reaches the connection between the functional layer laminates and seals it. An acceptable sealing is reached if a distance of 2.5 mm, particularly 3 mm is present between the connection between the laminates and the side wall of the ventilating container element.

It is pointed out that the dimensions of the upper functional layer laminate and the bottom functional layer laminate may be independent from the dimensions of the upper portion and the lower portion of the upper assembly. For example, while the upper functional layer laminate may extend to the substantially horizontal portion of the upper assembly associated with the wearer's sole, the lower portion of the upper assembly may extend to the side walls of the shoe. In other words, the lower portion of the upper assembly may be any portion of the upper assembly that is positioned in a lower region of the upper assembly.

In an alternative embodiment a water vapour permeable membrane or functional layer could be placed on top of the ventilating container element instead of the membrane being part of the lower portion of the upper assembly. Such a membrane can be attached to the ventilating container element e.g. using adhesive and/or be attached with the ventilating container element to the upper assembly, e.g. by being included in the strobel stitch. The membrane need not lie directly adjacent to the ventilating container element; there may be one or several layers situated in between.

According to a further embodiment, the ventilating container element is provided with openings in its side wall and/or its bottom part. In this way, the ventilating container element allows for air communication between the filler structure or material and an outside of the ventilating container element. In other words, air communication between the inside and the outside of the ventilating container element is achieved. The openings may be adapted to the passages in a surrounding sole structure such that air communication between the filler structure or material and the outside of the shoe, that is the ambient air is established. Accordingly, water vapour discharge from the inside of the shoe to the environment is achieved along with the discharge of air. The openings may be made by laser, drilling or puncturing e.g with a hot needle or other thermal removal of wall material. They can also be shaped by pins of a mould when the ventilating container element is moulded. Such air communication openings do not have to be present in the prefabricated ventilating container element although this is of course also possible. They can be drilled or lasered or punctured and/or melted, e.g. with a hot needle through the wall of the ventilating container element into the filler structure or material in a subsequent manufacturing step. The same manufacturing options apply to the passages in a surrounding sole element.

Additionally/alternatively, the ventilating container element may be made at least partly of a material allowing for air flow through it, for example a porous material.

According to a further embodiment, the filler structure or material is discontinuous. According to a further embodiment, the filler comprises a number of filler elements, which are spherical in shape, e.g. filler balls. These filler elements are received by the container element. The filler elements themselves may be made of a material which does not allow for an air flow or water vapour to pass through it. However, with the filler elements having voids there between, an overall structure may be formed which does allow for air flow and thus water vapour transport through it. The filler elements may be selected based on their stability and comfort characteristics. The air flow through the filler structure may be adjusted by adjusting the size of the filler elements.

According to a further embodiment, the filler structure or material is open or porous, particularly is formed as a three-dimensional spacer. The three-dimensional spacer may be configured so that the structure or material maintains a spacing between layers situated beneath it and above it, in particular between the lower portion of the upper assembly and the bottom of the ventilating container element. In this way, the air flow through the structure or material is retained. Particularly, such a spacer structure or material may allow for a very low air flow resistance, while ensuring high stability of the combination of the ventilating container element and the spacer structure or material. In another embodiment, the spacer structure or material is made to be at least partially elastic. Because of this, the walking comfort of the shoe is increased, as the spacer structure or material allows for cushioning and an easier rolling process during the stance phase of the gait cycle. In another embodiment, the spacer structure or material is designed so that during maximal stress with the maximum weight of the shoe user to be expected corresponding to the shoe size in the corresponding shoe, it yields elastically at most to the extent that, even during such maximum stress, a significant part of the air flow of the spacer structure or material is still retained. The spacer may be made of materials such as e.g. polyester, polyolefins or polyamides.

In another embodiment, the air permeable spacer has a flat structure forming a first support surface and a number of spacer elements extending away from the flat structure at right angles and/or at an angle between 0 and 90°. The ends of the spacer elements lying away from the flat structure then together define a surface by means of which a second support surface, facing away from the flat structure, can be formed. In another embodiment, the spacer elements of the spacer are designed as knobs, the free knob ends together forming the second support surface mentioned. In another embodiment, the spacer has two flat structures arranged parallel to each other, the two flat structures being joined to each other via the spacer elements in a manner allowing for air flow through and between them and holding them spaced apart from each other. Each of the flat structures then forms one of the two support surfaces of the spacer. All the spacer elements need not have the same length in order to make the two support surfaces equidistant over the entire surface extent of the spacer structure. For special applications, it can be advantageous to make the spacer have different thickness in different zones or at different locations along its surface extent, in order to form a surface anatomically compatible with the foot. The spacer elements can be formed separately, i.e., not joined to each other between the two support surfaces. However, there is also the possibility of allowing the spacer elements to touch between the two support surfaces and the possibility of joining them at at least some of the contact sites, for example, with an adhesive or by the fact that the spacer elements consist of materials that can be welded to each other, such as a material that becomes adhesive from heating. The spacer elements can be rod- or thread-shaped individual elements or sections of a more complex structure, for example, a truss or lattice. The spacer elements can also be connected to each other in a zigzag or in the form of a cross-grating. In another embodiment, the spacer structure or material is formed by two air-permeable flat structures arranged substantially parallel to each other, which are joined to each other and spaced apart by means of mono- or multifilaments in a manner allowing for air flow through and between them.

According to a further embodiment, the filler structure comprises, at least in a portion thereof, a channel structure. The channel structure communicates with at least one of the openings in the ventilating container element. In particular, all openings of the ventilating container element may be in air communication with the channel structure. The channel structure allows for a distributed air connection between the underside of the lower portion of the upper assembly and at least portions of the side wall and/or bottom part of the ventilating container element. Water vapour can pass from the inside of the shoe to the channel structure provided inside the ventilating container element through the breathable layer of the lower portion of the upper assembly. Air communication between the channel structure of the filler and the outside of the ventilating container element is established through the openings in or else through the material of the ventilating container element, such that water vapour can pass to the outside or ambient surroundings at the lower part of the upper assembly together with the air flow out of the ventilating container element. The filler comprising the channel structure may be formed of a material that may or may not be permeable to water vapour. The channel structure may be formed at least at the upper side of the filler.

According to a further embodiment, said channel structure is formed in said filler, with said filler comprising a side wall, wherein the channel structure comprises a plurality of channels. These channels may be either transverse or longitudinal channels. At least some of the channels comprise air and moisture discharging ports. At least one of the channels is a peripheral channel, i.e. a channel that lies on the periphery or circumference of the filler, but inside the side wall. This peripheral channel intersects with a plurality of the other channels. The channels and the side wall form functional pillars. The ratio of the top surface area of the functional pillars ($A_p$) to the top surface area of the channels ($A_c$) of the channel structure is between 0.5 and 5.0.

The peripheral channel does not have to be closed or run along the entire circumference of the filler. The first kind of functional pillars is surrounded completely by channels, e.g. by two transverse channels and the left and right portions of a peripheral channel or by two transverse channels, one longitudinal channel and one peripheral channel or by two transverse channels and two longitudinal channels. The second kind of functional pillars is formed by respective upper portions of the filler surrounded by the inner end of the side wall and by the channel portions that are located closest to said inner end of the side wall. Such second kind of functional pillars can for example extend in longitudinal direction of the shoe between two adjacent transverse channels and in a transverse direction between the inner end of the side wall and the adjacent portion of the peripheral channel. The side wall extends between the outer surface of the side wall and an imaginary line drawn between those channel walls or channel ends or channel ports which are located closest to the outer surface of the side wall. The side wall does not have to be thick or load-bearing. It provides a boundary of the filler to the ventilating container element.

The channel structure may be formed in the top or upper part of the filler, i.e. starting at the upper surface facing towards the lower portion of the upper assembly and extending some way down into the filler. The channel structure may also be formed throughout the filler or in any other part thereof.

The air and moisture discharging ports are connected to the outside of the filler by openings passing through the side wall of the filler, such that air can pass from the channel structure of the filler to the outside of the filler and vice versa. The openings in turn are in air communication with the outside of the ventilating container element though the openings therein or through the porous material of the ventilating container element.

The functional pillars that are formed by the channel structure serve the first purpose of a good distribution of the pressure as imposed on the filler structure by the underside of the foot, and the second purpose of providing an efficient air and moisture collecting and transferring channel structure formed around the functional pillars to allow for good ventilation.

Moreover, the filler having a channel structure, as described above, has good flexing properties and is wear resistant. It can easily be manufactured, particularly in one moulding step, wherein the outer shape of the filler including the channel structure in the filler is formed by the moulds. The filler can be cast, injected or vulcanized.

By the relationship of the top surface area of the pillars to the top surface area of the channels being between 0.8 and 5.0 a good compromise between comfort, durability, supporting and pressure distribution properties on the one hand and the ventilation effect on the other is attained.

While many aspects and embodiments regarding the channel system have been and will be described with respect to the filler structure, the embodiments and advantages that are described herein relate equally to a combination of the ventilating container element and the filler structure having a channel system. In this case, the "side wall" of the filler structure may be embodied by the side wall of the ventilating container element.

According to a further embodiment, the ratio of the top surface area of the pillars to the top surface area of the channels lies between 1.0 and 3.0, and more particularly between 1.4 and 2.2.

The inventors have discovered that a particularly good compromise between supporting and pressure distribution properties, leading to a high degree of comfort for a wearer, and ventilation is attained when the top surface area formed by the pillars is equal to or greater than the top surface area defined by the channels. A particularly good compromise is attained when this ratio is between 1.0 and 3.0 and more particularly between 1.4 and 2.2.

This relationship can better be understood by having a look at the extremes: From a comfort point of view no channels in the filler structure at all are desired. From a ventilation point of view the open space in the filler structure that is created by the channel structure, should be as large as possible.

On the other hand the width of the channels is not arbitrary. Channels which are too narrow are not suitable, since they do not allow for enough collection and transport of air and moisture. Channels that are too wide do not feel comfortable because the wearer will feel the edges of the pillars. The wider the channels are, the more their edges will imprint on the above layers, in particularly the functional layer.

Taking all these points into account, the inventors of the present application have discovered that the relationship as described above is particularly advantageous.

According to a further embodiment of the invention, the functional pillars have a minimum upper edge length of 4 millimetres. All edges should be at least 4 mm long, both in the longitudinal and in the transverse direction.

According to a further embodiment of the invention, at least some of the lateral ends of said channels are formed as air and moisture discharging ports.

The channels may follow the shape of the filler. At least the bottom surface of the transverse channels may be substantially horizontal, when seen in the main direction of the transverse channels. In this case the channel depth varies throughout the filler. In another embodiment the bottom surface of the transverse channels is inclined downwards towards the centre of the filler. The channels may also be inclined downwards towards the outside of the filler.

According to a further embodiment of the invention, the width of the channels at the upper side of the filler structure lies between 2 and 5 millimetres, particularly between 2 and 3.5 millimetres.

According to a further embodiment of the invention, the channel structure has a first portion with a first channel width, and a second portion with a second channel width. By providing such portions with different channel widths different flexing and bending conditions occurring in such portions can be matched.

In a further embodiment of the invention such portions having a different channel width can be positioned under a heel portion of the foot and/or a forefoot portion of the foot, particularly a ball portion of the forefoot.

According to an embodiment of the invention, the channel width in such special portions can be smaller than the channel width in the other portions of the channel structure.

According to a further embodiment of the invention, the distances between adjacent transverse channels in the forefoot portion can be smaller than in the heel portion, in order to increase the effect of actively moving air and moisture to the outside. In the forefoot portion of the filler structure the flexing that occurs is greater than in the heel portion. Furthermore, the foot produces more sweat in this region than e.g. in the heel region. By such flexing the cross section of the channel is reduced and widened again which forces the air out of such channels. By providing a higher transverse channel density in the forefoot portion, such active effects can be increased which leads to a further improved ventilation effect.

The shape of the channels can be of different kinds. According to a further embodiment of the invention, the channels comprises channel walls and a channel bottom, wherein the distance between the walls of a channel, when seen in the sectional view, increases in an upwards direction. Such channel form provides for a good air and moisture collecting and transport function.

According to a further embodiment of the invention the channel bottom is formed as a substantially horizontal plane. By the provision of this feature, the channels, when seen in a sectional view, have an essentially isosceles trapezoid shape and, more particularly the form of an isosceles trapezoid.

According to a further embodiment of the invention, oblique bottom transition faces are provided between the substantially horizontal channel bottom and the channel walls.

In an alternative embodiment of the present invention, the channel bottom has a rounded, concave form, giving the channels a U-like shape, when seen in a sectional view.

The channels may be formed in a way that they do not have sharp corners and/or edges, such as corners or edges having acute angles. Due to the lack of 90° angles in the embodiments of the channel bottom, air and moisture cannot be trapped in any corners where no air/moisture movement can take place, as may be the case in rectangular shaped channels.

None of the above described channel forms are prone to mechanical failure, e.g. in the form of breakage as is the case for example with a plane V-shaped channel. Furthermore, due to the width of the channel bottoms in comparison to a simple V-shape the channels can take up far more air and moisture.

Any sharp edges reduce airflow due to friction and turbulence created and induce cracks and failure of the sole. This is particularly the case at the intersections of the channels. In a preferred embodiment at least the vertical edges of the channels are rounded, preferably having a radius of between 0.25 and 5 mm.

The horizontal edges of the channel/pillar tops may be rounded in another embodiment, preferably having a radius between 0.5 and 5 mm. This leads to less imprinting on the layers in the shoe above the filler and a more comfortable feeling for the wearer.

According to a further embodiment of the invention, one continuous peripheral channel is provided extending from a front portion to a rear portion of the filler structure. By such single continuous peripheral channel, a good collection and transport of air and moisture can be attained.

According to an alternative embodiment, at least two continuous peripheral channels are provided extending over different portions of the filler structure. Such peripheral channels can intersect with each other or they can be formed separately from each other. By the provision of at least two peripheral channels, a good air and moisture collecting and transporting function can be attained as well.

According to a further embodiment of the invention, the peripheral channel runs in a zigzag line, seen from a front section to a rear section of the filler structure. By using such a zigzag shaped peripheral channel, a particularly efficient transport of air and moisture to the air and moisture discharging ports can be achieved.

The zigzag form of the peripheral channel can be such that the outer points of such zigzag peripheral channel intersect with those transverse channels the ends of which are formed as air and moisture discharging ports, at a position just inside of those air and moisture discharging ports.

The channel structure as a whole, that is the arrangement of the various channels to each other is such that in a preferred embodiment, the maximum length that a water molecule has to travel from the inside of the filler structure to the nearest air and moisture discharging port is 60 mm.

According to a further embodiment of the invention, the air and moisture discharging ports have a greater depth, and in addition or instead they can be broadened as compared to the other channel portions. Thus, enough air and moisture can be received and transported further outwards by the air and moisture discharging ports.

During production of the air communication openings in the side wall of the ventilating container element by e.g. drilling or lasering or puncturing and/or melting e.g. with a hot needle, an increased depth or broadness of the ports allows for a much more reliable, safer and easier connection process of the openings to the channel system of the ventilating container element, safer in particular if a membrane or laminate is situated above the channel system structure.

According to a further embodiment of the invention the upper surface of the filler structure has a curved form with a lower front region and a higher rear portion, so as to accommodate the underside of the foot to be supported. The shape of the filler structure follows the shape of the anatomical last, which is ergonomically customized to the feet to be supported by the filler structure.

The channels may either follow the shape of the filler structure or else at least the bottom surface of the transverse channels may be substantially horizontal. In this case the channel depth varies throughout the filler structure. In another embodiment the bottom surface of the transverse channels in inclined downwards towards the center of the filler structure.

In order to make the shoe light weight it is preferred to use low density polyurethane (PU) e.g. having a density of 0.35 g/cm3 for the filler structure.

It is further preferred to use PU on a polyethylene (PE) basis for the filler structure.

It is further preferred to use a material that is not too hard for the filler structure for shock absorption reasons. Thus, a polyurethane material with a shore A hardness between 38 and 45 is preferred for the filler structure. Shore hardness is measured by the durometer test. A force is applied onto a spot of the polyurethane, whereby the force creates an indentation. The time taken for the indentation to disappear is then measured.

In a further embodiment of the invention the depth of the channels is less than 20 mm, preferredly between 3 and 10 mm. This avoids the wearer of the shoe experiencing a rolling movement when walking which would badly influence the comfort sensed by the wearer and which would effect a tilting torque on the functional pillars which over time may cause breakage of the functional pillars.

The functional pillars formed by the channel structure can have different sizes, especially length, depth and surface area, that can vary across the surface of the filler structure.

The functional pillars can also have different shapes, when seen in a plan view, for example a rectangular shape, a triangular shape or a rounded shape.

The inventors have found out that there is a relationship between the depth of the channels and the surface area of the functional pillars facing the upper assembly above. The less deep the channels are the smaller the surface area can be. A typical value of a functional pillar surface is 0.6 to 1 cm$^2$.

According to a further embodiment, the sole comprises at least one further sole element. Examples of further sole elements are a surrounding sole element, embodiments of which will be described in greater detail below, an outer sole element, embodiments of which will also be described in greater detail below, a sole comfort layer, etc. In general, the sole may be only comprised of the ventilating container element and the filler structure or material or may comprise more than these two components.

According to a further embodiment, said at least one further sole element comprises a surrounding sole element surrounding said ventilating container element at least laterally, with the surrounding sole element having at least one passage allowing for communication of air between the ventilating container element and an outside of the sole, that is the ambient air. In this way, the surrounding sole element may be designed in any desired shape and dimension, for example entirely surrounding the ventilating container element, and the air flow in the sole is maintained. In other words, by providing at least one passage in the surrounding sole element, no portion of the ventilating container element has to be exposed to the environment for the sole to still provide for air communication and air flow between the ambient air and the inside of the ventilating container element, that is the filler structure or material. Such a passage may be created by pins e.g. in the mould of said sole or else by lasering, drilling, puncturing, e.g. with a hot needle or other thermal removal of sole material. In a further embodiment said surrounding sole element may be porous in such a way as to allow for air flow through it. The surrounding sole element may be attached to the ventilating container element and to the upper assembly.

In a particular embodiment, said surrounding sole element may be formed around the entire side wall of the ventilating container element. It is, however, also possible that said surrounding sole element may be formed around a portion of the side wall of the ventilating container element only. Alternatively/additionally, said sole may form a layer below the bottom part of the ventilating container element. In a particular embodiment, said surrounding sole element surrounds said ventilating container element at least laterally and is attached to said upper assembly and to said side wall of said ventilating container element.

The shoe allows for the provision of a breathable portion below the wearer's foot, such that water vapour discharge through the ventilating container element and the surrounding sole element is achieved.

The shoe may be manufactured in a small number of processing steps from the semi-manufactured product comprising the upper assembly, the ventilating container element and the filler structure or material, as described above. With the ventilating container element and the filler structure contained therein being provided, the structural requirements in terms of breathability and the material requirements in terms of stability for the further sole elements to be attached thereto are kept to a minimum.

According to a further embodiment, the at least one passage in the surrounding sole element communicates with openings in the side wall and/or the bottom part of the ventilating container element. In a particular embodiment, each passage communicates with a respective opening in the side wall and/or bottom part of the ventilating container element.

According to a further embodiment, the at least one passage in the surrounding sole element comprises at least one lateral passage, particularly a plurality of lateral passages. A high level of water vapour discharge is achieved, particularly because air flow can take place in the lateral passage and the ventilating container element in a static environment, e.g. when sitting or standing. This flow may be enhanced by the movement of the shoe when the wearer is walking or running. Two favourable effects take place during a walking or running motion, each of which is predominantly associated with one of the two phases of the gait cycle, namely the actual stance phase and the shoe swinging phase in between the actual steps. During the shoe swinging phase, an air flow in and out of the ventilating container element through the at least one lateral passage is generated, with the lateral passages being very suitable to develop such air flow therein. This is particularly the case, because the outside end of the lateral passage is in air connection with the environment during all phases of the walking motion, allowing for water vapour discharge along with the air discharge at all times. The bending of the shoe sole during the walking or running motion and additionally the application of the wearer's weight on the ventilating container element, which comprises the filler structure or material, during the stance phase also forces air flow within the ventilating container element and the at least one lateral passage. The air pushed out of the ventilating container element takes water vapour from the inside of the shoe with it. The ambient air coming back into the ventilating container element can then be recharged with water vapour.

The lateral passages may be placed anywhere in the sole. Particularly, they may be situated in the back (heel region) of the sole and/or in the front (toe area). This allows the air with the water vapour to be more easily pushed through the filler structure and out of the lateral passages due to the rolling motion of the sole during walking.

According to a further embodiment, the ventilating container element does not comprise openings in its bottom part. Equivalently, according to a further embodiment, the surrounding sole element, if extending below the ventilating container element, does not comprise vertical passages extending through the surrounding sole element from the bottom side thereof to the bottom part of the ventilating container element. Not having vertical passages nor openings in the bottom part of the ventilating container element allows for a high flexibility of the sole design, particularly for the provision of stable, waterproof and non water vapour permeable sole layers across the complete extension of the underside of the foot. This may provide high comfort to the wearer, because the load bearing of the sole may be distributed over the whole area of the sole, such that less stiff materials may be used. The sole may feel more uniform and therefore more comfortable for the user than soles with vertical holes. An additional advantage is that a dirt/soil/mud/sand build-up on the underside of the sole does not compromise the water vapour discharge capability of the shoe. The lateral passages ensure breathability of the shoe in a wide variety of usage scenarios, in particular also in highly adverse usage environments. However, it is also possible that the sole comprises at least one vertical passage in addition to or instead of the at least one lateral passage for effecting air flow. The vertical passage may be provided in the surrounding sole element below the ventilating container element or in an outer sole element provided below the ventilating container element.

According to another embodiment, the upper surface of the combination of the ventilating container element and the filler structure has an anatomical shape with a lower front region and a higher rear region, so as to accommodate the underside of the foot to be supported.

According to a further embodiment, a water vapour permeable comfort layer is provided on top of at least parts of the combination of said ventilating container element and said filler structure or material. Particularly, the comfort layer may be provided on top of the filler structure or material only. It may also be provided on top of said ventilating container element, covering an upper surface of the filler structure or material in between the side walls of the ventilating container element.

According to a particular embodiment, the comfort layer may have a larger lateral extension than the filler structure or material, particularly projecting between 0.5 mm and 2 mm over the filler structure or material, more particularly projecting approximately 1 mm over the filler structure or material. The comfort layer may be provided to compensate for an uneven upper surface of the ventilating container element and/or the filler structure placed therein. As a structure or material allowing for air flow through it, the filler structure or material and/or the combination of the ventilating container element and the filler structure or material may have a heterogeneous or jagged structure. In particular, a channel system or channel grid may cause alternating portions of voids and solid material at the surface of the filler structure. The comfort layer allows for the discomfort potentially caused to the wearer of the shoe by these inhomogeneous portions to be greatly reduced or prevented. The water vapour permeable comfort layer may be of any suitable material that provides a highly comfortable feel to the wearer and that is able to withstand the loads and forces applied thereto during use. Exemplary materials are open cell polyurethanes. For example, the material may be POLISPORT (trademark) from company Jin Cheng Plastic, China. According to an embodiment, before assembling the comfort layer on the filler structure, mechanical pressure is applied to the material of the comfort layer, which is pressed, e.g., from 2 mm to 1 mm in thickness. This may be done to make the material more compact and hence to lower the amount of water absorbed. This advantageously prevents the material from acting as sponge which nurtures growth of fungus and the like.

The water vapour permeable comfort layer may be attached to the top of said ventilating container element and/or said filler structure or material, in particular by spotwise or circumferential gluing or by gluing across the entire surface with a breathable adhesive. Enhanced air flow characteristics in the filler structure may be achieved by spotwise gluing or gluing across the entire surface, as channels enclosed at their upper side may be formed.

According to a further embodiment, said comfort layer has a soft upper surface/side and a stiff lower surface/side facing the ventilating container element. The lower stiff side can be made of a non woven synthetic fabric and the upper side of a foamed polyurethane. The comfort layer may consist of two discrete layers. It is also possible that the comfort layer is a single laminated comfort layer with a soft upper side and a stiff or flexurally rigid lower side. With the lower layer being comparably stiff or hard, the comfort layer may be prevented from being pressed into the channel structure of the filler structure more than 1 mm. Stiffness or flexural rigidity is defined e.g. in German DIN Norm 53864 with respect to textiles. In this way, the comfort layer characteristics are preserved as desired, with the comfort layer being very durable during use of the shoe. The soft upper layer may provide for a very comfortable feel of the sole for the wearer's foot. In an embodiment of the invention the soft upper layer has a smooth surface with the difference between peaks and valleys of no more than 0.1 mm.

In a particular embodiment, both the upper layer and the lower layer of the comfort layer are made of polyester. The upper and lower layers may be joined via a hot melt adhesive. In a particular embodiment, the material properties of the upper layer and the lower layer as as follows. The stiff lower layer has the following properties: a tensile strength in the lengthwise direction between 400 N/5 cm and 700 N/5 cm (UNI EN 29073/3), particularly between 500 N/5 cm and 600 N/5 cm; and a tensile strength in the crosswise direction between 500 N/5 cm and 800 N/5 cm (UNI EN 29073/3), particularly between 600 N/5 cm and 700 N/5 cm. The soft upper layer has the following properties: a tensile strength in the lengthwise and the crosswise direction between 50 N/5 cm and 200 N/5 cm (UNI EN 29073/3), particularly between 100 N/5 cm and 150 N/5 cm.

In a further embodiment the comfort layer has a thickness of less than or equal to 2.0 mm, a water absorption of <45% by weight and an MVTR (Moisture Vapour Transmission Rate) of >5000 g/m2/24 h, preferably about 8000 g/m2/24 h. In an embodiment a breathable and waterproof layer, in particular a functional layer or membrane, may be provided on top of the comfort layer. The combination of comfort layer and membrane has an MVTR >2000 g/m2/24 h, preferably about 4500 g/m2/24 h. MVTR was measured according to the potassium acetate test described in DIN EN ISO 15496.

According to a further embodiment, the underside of said ventilating container element forms at least a part of an outer sole. Particularly, the undersides of said surrounding sole element and said ventilating container element may form at least a part of an outer sole. The underside of said ventilating container element may be arranged at a higher position as compared to the underside of said surrounding sole element.

According to a further embodiment, the surrounding sole element consists of a first polyurethane and the filler structure or material consists of a second polyurethane, the second polyurethane being softer than the first polyurethane. Particularly, said second polyurethane may have a Shore A value of 35-45. In this way, the filler structure or material may not be too hard and provides good shock absorption properties. It is also possible that the surrounding sole element and the filler structure or material consist of the same polyurethane. Shore hardness is measured by the durometer test. A force is applied onto a spot of the polyurethane, whereby the force creates an indentation. The time taken for the indentation to disappear is then measured.

According to a further embodiment, said at least one further sole element comprises an outer sole element forming at least a part of an outer sole, said outer sole element being arranged at least below said ventilating container element. The additional sole element is not necessarily arranged directly adjacent to the ventilating container element. For example, a further layer, such as an additional sole comfort layer, may be positioned in between. The outer sole element may be arranged below said surrounding sole element and said ventilating container element.

According to a further embodiment, said surrounding sole element extends below said ventilating container element. Particularly, said surrounding sole element may form at least a part of an outer sole. Alternatively/additionally said at least one further sole element comprises an outer sole element forming at least a part of an outer sole and being arranged below said surrounding sole element. The outer sole element is not necessarily arranged directly adjacent to the surrounding sole element. For example, a further layer, such as an additional sole comfort layer, may be positioned in between.

According to a further embodiment, supporting members are formed in portions of said surrounding sole element below said ventilating container element, said supporting members extending substantially vertically through said surrounding sole element. Supporting members may also be formed in an outer sole element arranged below said ventilating container element.

According to a further embodiment, said sole is attached to the upper assembly by adhesive, i.e. glued to the upper assembly, or said sole is moulded or injected to the upper assembly. According to a particular embodiment, an attachment between the sole and the upper assembly is provided by the surrounding sole element being moulded onto at least the ventilating container element and the upper assembly.

According to a second aspect of the invention, there is provided a sole assembly according to the features of claim 38.

In particular, in an aspect of the invention, there is provided a sole assembly for a shoe, comprising a ventilating container element having a bottom part and a side wall surrounding said bottom part so as to form an inner space of the ventilating container element; and a filler structure or material allowing for air flow through it placed in the inner space of the ventilating container element.

The sole assembly according to the invention allows for an effective transfer of water vapour out of a shoe being equipped with said sole assembly. The filler structure or material ensures that air can flow through it, and therefore facilitates water vapour discharge from the underside of the foot through the sole of the shoe. With the prerequisite that an upper assembly of the shoe is equipped with a breathable lower portion, water vapour is discharged from the inside of the shoe through the breathable lower portion, through the filler structure or material, through the ventilating container element and, if present, through the surrounding sole element. Above described details about the air flow and the water vapour discharge equally apply to the sole assembly. Accordingly, the sole assembly allows for the provision of a breathable shoe.

The sole assembly according to the invention also allows for the provision of a well-defined semi-manufactured product whose ventilating container element helps with the manufacture of shoes in a number of different ways. The sole assembly containing the ventilating container element may be used as the structural base for a shoe that allows for many options of reaching the finished product of a shoe, but also keeps the requirements for the upper assembly low in order to reach a highly breathable shoe. As discussed above, the ventilating container element is the pivot of the shoe in that it establishes a structure, to which the remainder of the sole assembly and an upper assembly are attached. The ventilating container element ensures that various different embodiments of sole elements as well as upper assemblies can be combined to form the shoe. The combination of the ventilating container element and the filler structure or material allowing for air flow through it in the sole assembly ensures high stability, such that a wide variety of upper assemblies may be combined with this sole assembly without having to fulfil strict stability criteria. The sole assembly forms a base that allows for the manufacture of various highly breathable shoes.

Said ventilating container element may extend across the whole lateral extension of the sole of a shoe or across portions thereof.

In a particular embodiment, the sole assembly further comprises a surrounding sole element surrounding said ventilating container element at least laterally, with the surrounding sole element having at least one passage allowing for communication of air between the ventilating container element and an outside of the sole, or said surrounding sole element being porous.

In a further embodiment, the sole assembly further comprises a water vapour permeable comfort layer provided on top of said filler structure or material.

In a further embodiment, the sole assembly further comprises a breathable and waterproof layer provided above said filler structure or material, in particular on top of said comfort layer.

The modifications and advantages described above with respect to the ventilating container element and with respect to the shoe in general are equally applicable to the ventilating container element being provided in a sole assembly as well as to the sole assembly.

According to a third aspect of the invention, there is provided a semi-manufactured product according to the features of claim 42.

In particular, in an aspect of the invention, there is provided a semi-manufactured product for a shoe, comprising an upper assembly comprising an upper portion having an outer material for surrounding a foot and a lower portion having at least a breathable layer; a ventilating container element having a bottom part and a side wall surrounding said bottom part so as to form an inner space of the ventilating container element, the ventilating container element being arranged below and attached to the upper assembly; and a filler structure or material allowing for air flow through it placed in the inner space of the ventilating container element.

The semi-manufactured product according to the invention allows for the provision of an easy to handle unit that can be completed in few manufacturing steps to yield a highly breathable shoe having the advantageous characteristics described above. The advantages and modification described above with respect to the shoe and the sole assembly are equally applicable to the semi-manufactured product for a shoe.

According to a fourth aspect of the invention, there is provided a method for manufacturing a sole assembly according to the features of claim 43.

In particular, in an aspect of the invention, there is provided a method for manufacturing a sole assembly, comprising the steps of providing a ventilating container element having a bottom part and a side wall surrounding said bottom part so as to form an inner space of the ventilating container element; and arranging a filler structure or material allowing for air flow through it in the inner space of the ventilating container element. The ventilating container element has openings in its side wall and/or bottom part or is porous, allowing for air communication between the filler structure or material and an outside of the ventilating container element.

According to a further embodiment, the method for manufacturing a sole assembly comprises attaching a surrounding sole element to the ventilating container element, the surrounding sole element surrounding the ventilating container element at least laterally and having at least one passage or being porous, allowing for communication of air between the ventilating container element and an outside of the sole assembly.

According to a further embodiment, the method for manufacturing the sole assembly comprises the steps of placing the ventilating container element in a mould; closing the mould and injection moulding so as to form said surrounding sole element.

According to further aspects of the invention, there are provided methods for manufacturing a shoe according to the features of claims 45 and 46.

In particular, in an aspect of the invention, there is provided a method for manufacturing a shoe, comprising manufacturing a sole assembly as described above and attaching said sole assembly to an upper assembly comprising an upper portion having an outer material for surrounding a foot and a lower portion with at least a breathable layer.

In particular, in an aspect of the invention, there is provided a method for manufacturing a shoe, comprising the steps of providing an upper assembly comprising an upper portion having an outer material for surrounding a foot and a lower portion with at least a breathable layer, providing a ventilating container element having a bottom part and a side wall surrounding said bottom part so as to form an inner space of the ventilating container element, placing a filler structure or material allowing for air flow through it in the inner space of the ventilating container element, and providing an attachment between the side wall of the ventilating container element and the upper assembly.

In a further embodiment, the step of providing an attachment between the side wall of the ventilating container element and the upper assembly comprises attaching a surrounding sole element to the upper assembly and to the ventilating container element, in particular via-injection moulding of the surrounding sole element, the surrounding sole element surrounding the ventilating container element at least laterally and having at least one passage or being porous, allowing for communication of air between the ventilating container and an outside of the shoe.

In an alternative embodiment, the step of providing an attachment between the side wall of the ventilating container element and the upper assembly is carried out in a first injection-moulding step, with the method further comprising the step of forming a surrounding sole element to the upper assembly and to the ventilating container element in a second injection-moulding step, the surrounding sole element surrounding the ventilating container element at least laterally and having at least one passage or being porous, allowing for communication of air between the ventilating container and an outside of the shoe.

In a further embodiment, the method for manufacturing a shoe is a method for manufacturing a waterproof, breathable shoe, wherein said attachment between the side wall of the ventilating container element and the upper assembly, created in the first injection moulding step, at the same time acts as a seal between a waterproof, breathable upper functional layer laminate and a waterproof, breathable bottom functional layer laminate of the waterproof, breathable upper assembly of the shoe, the method comprising the following steps: placing a removable insert in a mould, placing said ventilating container element on the removable insert, placing the lasted upper assembly in the mould and resting the lower portion of the upper assembly against the ventilating container element, closing the mould and performing the first injection-moulding step. The step of attaching a surrounding sole element may then comprise the steps of opening the mould, raising the lasted upper, removing the removable insert, lowering the lasted upper into the mould, closing the mould and performing the second injection-moulding step. In this way, the same mould may be used for the first and the second injection-moulding step, with the removable insert ensuring that only the seal is carried out in the first injection-moulding step. In this way, a highly accurate seal may be achieved in the first injection-moulding step with a low amount of injection material, with the seal effectively preventing the large amounts of injection material from entering the breathable areas in the second injection-moulding step.

The methods for manufacturing a sole assembly and a shoe may be modified corresponding to the modifications discussed above with respect to the sole assembly and the shoe. In other words, manufacturing steps corresponding to additional sole assembly/shoe elements/features may be included in the methods for manufacturing. It is explicitly pointed out that the steps of attaching, described for the methods of manufacturing a shoe or a sole assembly according to above aspects of the invention, may be the only steps of attachment. It is, however, also possible that additional attachments between the given elements are present.

FIG. 1 is an exploded three-dimensional view of the main components of a shoe in accordance with a first embodiment of the invention.

FIG. 5a is a schematic cross-sectional view of a shoe in accordance with a tenth embodiment of the invention.

FIG. 5b is a schematic cross-sectional view of a shoe in accordance with an eleventh embodiment of the invention.

FIG. 6a is a schematic cross-sectional view of a shoe in accordance with a twelfth embodiment of the invention.

FIG. 6b is a schematic cross-sectional view of a shoe in accordance with a thirteenth embodiment of the invention.

FIG. 7a is a schematic cross-sectional view of a shoe in accordance with a fourteenth embodiment of the invention.

FIG. 7b is a schematic cross-sectional view of a shoe in accordance with a fifteenth embodiment of the invention.

Figure 2A:
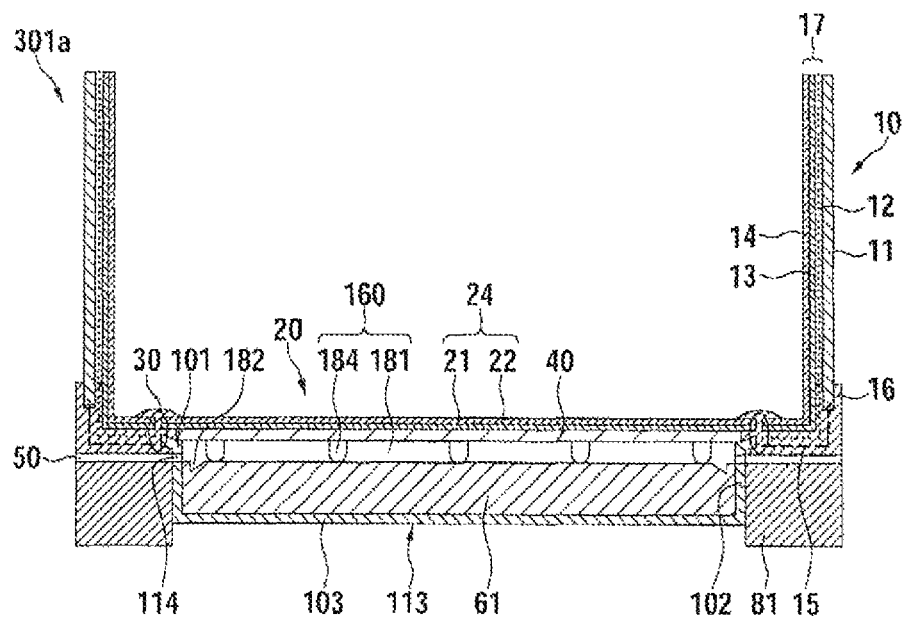
FIG. 2a is a schematic cross-sectional view of a shoe in accordance with a second embodiment of the invention.

In the following, exemplary embodiments of a shoe in accordance with principles of the invention will be described. The skilled person will be aware that various changes or adaptations may be made as far as appropriate and depending on the particular needs of the respective shoe construction.

FIG. 1 shows an exploded three-dimensional view of main components of a shoe 300 according to an embodiment of the invention. The shoe components are, from bottom to top in the exploded view, an outsole 90, a shank 172, a ventilating container element 113 having a filler structure 60 placed inside of it, a comfort layer 40, a surrounding sole element 80, and an upper assembly 8, with an outer material of the upper assembly being visible.

The primary purpose of FIG. 1 is to provide context for the following Figures. The position of a vertical plane including horizontal line Y-Y corresponds to the positions of the cross-sectional planes depicted in the following Figures. It is pointed out that the embodiments of the following Figures are different from the shoe 300, but that the position and viewing direction of the respectively depicted vertical cross-sectional planes can be inferred from the line Y-Y and the associated arrows, which represent the viewing direction.

The outsole 90 comprises a tread or corrugated structure on its lower surface for improving the grip characteristics of the shoe during walking. The shank 172 is provided in the shoe 300 to give it additional stability. The shank 172 may be made of metal or any other suitable material. The shank 172 may be arranged below the ventilating container element 113, as shown, or may be arranged within the filler structure 60. It is pointed out that the shank 172 is an optional component, which is not shown in most embodiments. The ventilating container element 113 has a filler structure 60 placed inside of it and comprises a collar 101 at its upper lateral edge. The ventilating container element 113 is provided with a plurality of openings 114 in its side wall 102, which are in air communication with a plurality of lateral passages 50 provided in the surrounding sole element 80. The surrounding sole element 80 has a varying height across its circumference, with the lateral passages 50 being arranged at different heights. In this way, the positions of the lateral passages 50 account for the uneven surface structure of the inner ventilating container element 113, which takes into account the wearer's foot and its positioning during walking.

The filler structure 60 comprises a channel structure, in particular a channel grid, at its upper side. The channel structure is in air flow communication with the openings 114 in the ventilating container element 113. The channel structure comprises transverse channels, generally designated with reference numeral 181. Channels 184 cross the transverse channels 181. The outermost channel of the channels 184 may be referred to as peripheral channel, as it is arranged at a peripheral portion of the filler structure. In the particular embodiment of FIG. 1, the peripheral channel forms a loop around a peripheral portion of the filler structure. The other channels 184 are referred to as longitudinal channels. For the sake of simplicity in describing different shoe constructions by presenting cross-sectional views in FIGS. 2 to 7, the channels 184 are generally referred to as longitudinal channels, although one or more of the channel cross-sections shown may belong to one or more peripheral channels.

Exemplary embodiments of the components are described in greater detail below. FIGS. 2 to 7 show portions of cross-sections through shoes in accordance with embodiments of the invention. The cross-sections are schematic in that they show a u-shaped shoe portion. It is apparent to a person skilled in the art that the shoe is closed on top, in particular in a forefoot region.

FIG. 2a is a schematic cross-sectional view of a shoe 301a in accordance with an embodiment of the invention. The shoe 301a comprises an upper assembly having an upper portion 10, a lower portion 20, a ventilating container element 113 and a filler structure 61 allowing for air flow through it.

The lower portion of the upper assembly may extend between lower end areas of the upper portion of the upper assembly such as shown in the examples of FIGS. 2 to 7. Particularly, the lower portion may be seen as the lower part of the upper assembly extending between the seams 30, which will be discussed below. However, in principle, the lower portion of the upper assembly may be seen as any part of the upper assembly in a lower region thereof. It may also include and potentially extend beyond the seams. Accordingly, it may encompass also parts of the side portions of the upper assembly. In other words, the limit between the upper portion of the upper assembly and the lower portion of the upper assembly is not necessarily defined by the connection 30 as shown throughout the Figures. The lower portion of the upper assembly may be the lower part of the upper assembly, in particular the substantially horizontal portion associated with the sole of the wearer's foot and lower portions of the side walls of the upper assembly adjacent the substantially horizontal portion. In the terminology of the invention, the surrounding sole element of the exemplary embodiments of FIGS. 2 to 7 may be seen as attached to the lower portion of the upper assembly, although it is attached to element 10 only or attached to both elements 10 and 20, which will become apparent throughout the description of the Figures.

The upper portion 10 comprises, from outside to inside, a breathable outer material 11, also referred to as upper material, a mesh 12, an upper membrane 13, and a textile lining 14. The mesh 12, the upper membrane 13 and the textile lining 14 are provided as a laminate 17, also referred to as upper functional layer laminate 17. The upper membrane is breathable and waterproof. With all of the upper material 11, the mesh 12 and the textile lining 14 being breathable, i.e. water vapour permeable, the upper portion 10 as a whole is breathable and waterproof.

The upper material 11 may be any breathable material suitable for forming the outside of a shoe, such as leather, suede, textile or man made fabrics, etc.

The upper functional layer laminate 17 may be any suitable waterproof and breathable laminate, such as commercially available GORE-TEX® laminate from W.L. Gore & Associates.

A lower portion of the outer material 11 is comprised of a netband 15. The netband 15 may be attached to the remainder of the outer material 11 through any suitable way of connection, for example stitching or gluing. In the exemplary embodiment of FIG. 2a, the netband 15 is attached to the remainder of the outer material 11 via stitching 16, as illustrated by a connecting line. As the term netband suggests, this portion of the outer material is not a continuous material, but comprises voids in the material that allow for the penetration of fluid sole material therethrough, as will be explained later. Instead of providing a netband, the lower portion may also be comprised of the same material as the remainder of the upper material, with the voids being generated by puncturing or perforating the outer material in the lower portion or at least the lower portion being made of a material which is able to be penetrated by adhesive or moulding material.

The lower portion 20 comprises, from bottom to top, a lower membrane 21 and a supporting textile 22. The textile may be a woven, non-woven or knitted textile, for example Cambrelle®. The lower membrane 21 and the supporting textile 22 are provided as a laminate 24, also referred to as bottom functional layer laminate 24. The lower membrane 21 is waterproof and breathable. With the supporting textile 22 being breathable, an overall breathable and waterproof bottom functional layer laminate 24 is provided. The bottom functional layer laminate 24 may be any suitable laminate, for example commercially available GORE-TEX® laminate from W.L. Gore & Associates.

The upper portion 10 and the lower portion 20 are connected to each other at their respective end areas. Particularly, a lower end area of the upper functional layer laminate 17 is connected to a side end area of the bottom functional layer laminate 24. In the embodiment of FIG. 2a, this connection 30 also connects an end area of the netband 15 to the upper functional layer laminate 17 and the bottom functional layer laminate 24. The bottom functional layer laminate 24, the upper functional layer laminate 17 and the netband are stitched together, for example by a strobel stitch or a zigzag stitch. Accordingly, a connection 30 in the form of a sewn seam is formed connecting the bottom functional layer laminate 24, the netband of the upper material 11 and the upper functional layer laminate 17. This seam 30 is sealed in a waterproof manner by sole material, as will be explained later, such that a waterproof structure is formed by the upper portion 10 and the lower portion 20.

The upper functional layer laminate 17 and the bottom functional layer laminate 24 may be positioned end-to-end before being connected and sealed together, as shown in FIG. 2a. Both laminates may also be bent downwards, such that respective portions of the upper sides of the laminates are positioned adjacent each other. In these different positions, the laminates may be connected, for example through stitching as shown, and the connection region may be sealed. The netband 15 of the outer material 11 may be positioned corresponding to the upper functional layer laminate 17, i.e. in an end-to-end or overlap or bent relation with respect to the bottom functional layer laminate 24, such that the connection 30 also connects the netband 15 to the bottom functional layer laminate 24 and the upper functional layer laminate 17. The netband 15 may also extend through the connection 30, which is uncritical due to its porous structure. Other methods of sealing the bottom functional layer laminate and the upper functional layer laminate include welding them together or heating overlap regions and pressing them with sufficient force against each other such that a waterproof seal is formed, etc. These different options for forming the connection 30 may be applied to all embodiments described herein.

In the embodiment of FIG. 2a, the connection 30 between the upper functional layer laminate 17 and the bottom functional layer laminate 24 is located at the substantially horizontal portion of the inside of the shoe 301a, which is intended to support the underside of the wearer's foot. In the cross-sectional plane of FIG. 2a, the connection is close to the lateral end of said substantially horizontal portion, i.e. close to the point where the portion for supporting the weight of the foot transitions into the side wall of the shoe. Due to the nature of the shoe 301a, the bottom functional layer laminate 24 is a substantially foot-shaped structure, with the upper functional layer laminate 17 being connected thereto perimetrically. It is pointed out that the terms horizontal and vertical refer to the horizontal and vertical directions present when the shoe is placed with the sole on an even ground. For an easier understanding, the shoes are depicted in that orientation throughout the Figures.

The ventilating container element 113 is provided below the lower portion 20 of the upper assembly. In the cross-sectional view of FIG. 2a, the bottom part 103 and the side wall 102 of the ventilating container element 113 form a rectangular inner space, wherein the filler structure or material 61 allowing for air flow through it is disposed. With the shoe being a three-dimensional object, the container element 113 forms a three-dimensional container, which can also be viewed as a tub or a trough, which holds the filler structure 61. The side wall of the ventilating container element may substantially follow the outline of a wearer's sole when seen from the bottom, but may be somewhat smaller than the outline of the sole. However, the ventilating container element may also extend over a portion of the underside of the wearer's sole only. Depending on the particular requirements of a particular shoe, the bottom part as well as the side wall of the ventilating container element may be arranged at a non-constant height with respect to the ground. The side wall may also have a non-constant height extension along its perimeter. For example, the wearer's heel may be intended to be positioned higher than the wearer's forefoot, such that the side wall of the ventilating container element may have a larger height extension in a heel area than in a forefoot area. The filler structure or material may be shaped according to the ventilating container element.

The ventilating container element 113 is provided with openings 114 in its side wall 102, two of which are shown in the cross-sectional view of FIG. 2a. These openings are dimensioned to allow for air communication between the inside of the ventilating container element 113, in particular the filler structure 61, and the outside of the ventilating container element, and eventually the ambient air.

Exemplary materials used for the ventilating container element are mouldable polymers such as polyurethane (PU), polyamides (PA), polyesters (PES), thermoplastic polyurethane (TPU), etylene vinyl chloride (EVA), poly vinyl chloride (PVC) or rubber.

The filler structure 61 comprises a channel structure or channel system 160 that allows for air communication between the upper side of the filler structure 61 and the openings 114 provided in the side wall 102 of the ventilating container element 113. The channel system 160 of the embodiment of FIG. 2a comprises a plurality of longitudinal channels 184, arranged in the longitudinal direction of the shoe 301a, and a plurality of transverse channels 181, arranged in the transverse direction of the shoe 301a, i.e. in the direction orthogonal to the longitudinal direction of the shoe.

The cross-sectional view of FIGS. 2 to 7, cuts through a transverse channel 181 of the channel structure 160 along the horizontal line Y-Y of FIG. 1. Therefore, the transverse channel 181 of the filler structure 61 is not shown in a shaded manner, as the cross-sectional cut reaches through the open channel. In contrast thereto, the portions of the filler structure 61 below the channel structure 160, the ventilating container element 113, the surrounding sole element 81, which will be described below, and further elements are shown in a shaded manner illustrating that the cross-section of FIG. 2a slices through these shoe elements in the depicted cross-sectional plane.

In the cross-sectional view of FIG. 2a, the longitudinal channels 184 are seen in their cross-sectional shape, which is a u-shape reaching from the upper surface of the filler structure 61 to approximately the centre of the filler structure 61. The portions of the filler structure 61 between the longitudinal channels are not shown in a shaded manner, because in the cross-sectional plane of FIG. 2a, no material is cut there. The transverse channel 184 cut in the cross-section of FIG. 2a is confined by a surface of the portions between the longitudinal channels 181 lying behind the cross-sectional plane. Accordingly, the transverse channel 184 depicted extends longitudinally behind the cross-sectional plane of FIG. 2a, with the non-shaded portions of the filler structure 61, which surround the u-shaped longitudinal channels, forming a transverse boundary. Only the u-shaped longitudinal channels 184 form a longitudinal air connection to further transverse channels behind and in front of the cross-sectional plane of FIG. 2a.

The u-shape of the longitudinal channels 184 and the transverse channels 181 allows for a good compromise between providing sufficient channel volume for fluid communication and providing a strong filler structure for supporting the wearer's foot and transferring the wearer's weight to the ground and/or the surrounding sole element 81.

Also, the u-shaped channels can be manufactured easily and quickly, particularly in the case of an injection-moulded filler structure 61, because the rounded channel side walls allow for an easy parting of the filler structure 61 and the mould after the moulding operation. Furthermore, this channel shape provides for a particularly durable channel structure.

It is pointed out that the channels of the filler structure 61 may have any suitable cross-section that allows for an efficient transfer of air and with it water vapour from the upper side of the filler structure 61 to the openings 114 in the side wall 102 of the ventilating container element 113. At the same time, the combination of the ventilating container element 113 and the filler structure 61 should provide a stable structure for serving as the core of the shoe. It is also pointed out that the channels may have varying cross-sections along their length in order to form a channel system having desired properties.

The exemplary embodiment of FIG. 2a comprises five longitudinal channels 184, which are distributed across the width of the filler structure 61 in a uniform manner. It is also possible that the longitudinal channels have varying widths and/or are distributed non-uniformly across the width of the filler structure 61. Further, it is possible that these channels are at an angle with respect to the longitudinal direction of the shoe 301a, such that any suitable channel structure 160 may be formed. The outer longitudinal channels may be connected e.g. at the toe and the heel areas so as to form at least one surrounding or circular peripheral channel.

The transverse channel 181 connects the longitudinal channels 184 to each other and to the openings 114 in the side wall 102 of the ventilating container element 113. At its lateral ends, the transverse channel is equipped with air and moisture discharging ports 182. The air and moisture discharging ports 182 are arranged laterally outside from the laterally outmost longitudinal channel. In particular, the air and moisture discharging ports 182 are arranged directly adjacent the side wall 102 of the ventilating container element 113. The air and moisture discharging ports 182 are formed by recesses in the floor of the transverse channels 181. In other words, the floor of the transverse channels 181 extends deeper down into the filler structure 61 in the region of the air and moisture discharging ports 182 than throughout the remainder of the transverse channels 181. The air and moisture discharging ports 182 allow for an efficient collection of moisture/water vapour from the inside of the shoe, from where the water vapour can be carried away effectively through the openings 114 and the lateral passages 50. All or only a subset of the transverse channels may 181 have air and moisture discharging ports. Only the embodiment of FIG. 2a is shown with air and moisture discharging ports. It is, however, pointed out that the channels of the channel systems of the other embodiments may be provided with air and moisture discharging ports as well.

All or only a subset of the transverse channels may provide for the connection with the openings 114 in the side wall 102 of the ventilating container element 113. There may also be transverse channels that are not in air communication with openings 114 of the ventilating container element 113, but end in dead ends. The transverse channels 181 of the filler structure 61, one of which is being shown in FIG. 2a, allow for air communication between the channel system 160 of the filler structure 61 and the outside of the ventilating container element 113. With the bottom functional layer laminate 24 being breathable, water vapour transport from the inside of the shoe to the lower lateral outside of the upper assembly, that is the ambient air, is ensured through the ventilating container element 113, which allows the air containing water vapour to pass through it.

It is pointed out that the transverse channels 181 may have the same, a smaller or greater height than the longitudinal channels 184. They may be channels that reach from the top of the filler structure 61 towards the inside of the filler structure, such that they can also be seen as grooves or trenches. It is also possible that the transverse channels lie below a portion of the filler structure 61 and are therefore not readily visible from the top of the filler structure 61. Also, the longitudinal channels may be grooves, as shown, or channels concealed from the upper surface of the filler structure 61.

In the present embodiment, the channel system 160 of the filler structure 61 is a channel grid. The channels of the channel grid extend from the top of the filler structure 61 to the inside thereof. The channels may be longitudinal and transverse channels, which intersect for allowing air communication therebetween. The channels may also be diagonal channels, when seen from the top of the filler structure. In general, such a channel grid may have any combination of longitudinal, transverse and diagonal channels. It is pointed out that any channel structure may be embodied in all other constructions of the remainder of the shoe, in particular in combination with all other sole constructions and all other constructions relating to the remainder of the upper assembly.

The ventilating container element 113 also comprises a collar or circular lip 101. The collar 101 is a part of the ventilating container element 113 at the lateral upper ends thereof. As the ventilating container element 113 is a three-dimensional structure, the collar 101 surrounds the perimetric upper edge thereof. In other words, the collar 101 is arranged at the periphery of the upper lateral portion of the ventilating container element 113. Accordingly, the term circular is not intended to be understood as referring to the shape of a circle. Also, the term collar is not intended to imply a circular shape. Instead, it is understood as referring to a structure surrounding an inner space or as referring to a loop structure. However, the term is also not intended to require a closed lip or collar structure. The collar may be continuous around the perimeter of the ventilating container element 113, but it may also be made of a plurality of spaced apart lip sections or collar sections distributed around the perimeter of the ventilating container element 113. The collar also does not need to be attached to the remainder of the ventilating container element 113 right at the upper lateral edge thereof. It may also be attached to the side wall 102 or the upper side thereof. However, a positioning in the vicinity of an upper circumferential edge of the ventilating container element may be beneficial, as will be discussed below.

The collar 101 may perform one or more of the functions described below. As shown in FIG. 2a, the collar 101 extends to the position of the connection 30. It is slightly angled upwards as compared to the horizontal direction. The connection 30 includes the collar 101, such that it connects the upper portion 10, the lower portion 20 as well as the ventilating container element 113 containing the filler structure 61. In particular, the strobel stitch 30 connects the upper functional layer laminate 17, the netband 15 of the upper material 11, the bottom functional layer laminate 24 and the collar 101 of the ventilating container element 113. Hence, the collar 101 allows for an attachment of the ventilating container element 113 to the remainder of the upper assembly, such that a one-piece upper assembly is formed, whose elements are in fixed positions with respect to each other.

This attachment is independent from the attachment of the ventilating container element 113 to the lower portion of the upper assembly via the surrounding sole element 81, which will be described below. The well-defined semi-manufactured product of the upper assembly comprising the upper portion 10, the lower portion 20, a comfort layer 40, which will be described below, and the ventilating container element 113, including the filler structure 61, is formed by the attachment of the ventilating container element 113 to the upper assembly.

The ventilating container element 113 and the collar 101 may be made of one piece or more pieces. In other words, the collar 101 may be an integral part of the ventilating container element 113 or it may be a part attached in a separate manufacturing step to the remainder of the ventilating container element 61. Particularly, the ventilating container element 113—including the collar 101—may be produced in one manufacturing step, for example through injection-moulding. In this way, a strong connection between the collar 101 and the remainder of the ventilating container element 113 is ensured, which results in a strong attachment of the whole ventilating container element 113 to the lower portion of the upper assembly.

It is also possible that the ventilating container element 113, comprising the collar 101, is attached to the lower portion of the upper assembly by gluing of the collar 101 onto the lower portion of the upper assembly or by effecting an attachment between the collar 101 and the lower portion of the upper assembly through a local injection-moulding operation in the region of the collar 101, particularly only in the region of the collar 101.

The collar 101 may extend from the ventilating container element in any direction between and including a lateral direction towards the outside of the ventilating container element 113, that is a horizontal direction, and a vertical direction upwards from the ventilating container element 113.

The shoe 301a further comprises a comfort layer 40. The comfort layer 40 is positioned above the ventilating container element 113 and the filler structure 61. The comfort layer 40 may be loosely positioned there or may be attached thereto before further manufacturing of the shoe. Such attachment may be achieved by a spot-gluing or circumferential gluing or by gluing making use of a breathable adhesive, such that the flow of water-vapour from the inside of the shoe to the filler structure 61 is not prevented. Also, the full surface of the filler structure 61 can be glued, and in order to prevent glue from entering the channels, a highly thixotropic glue should be used. The comfort layer 40 is inserted for increasing the soft walking feel for the user, particularly for ensuring that the user does not feel bothered by the channel system 160 of the filler structure 61. In the exemplary embodiment of the shoe 301a, the comfort layer has a greater lateral extension than the channel system 160 of the filler structure 61 and extends somewhat above the region of the collar 101. However, the comfort layer 40 does not extend to the lateral edges of the collar 101 where it is attached to the lower portion 20 of the upper assembly. In general, the comfort layer may have the same or smaller lateral dimensions as/than the combination of the ventilating container element and the filler structure. In particular, the comfort layer may have the same lateral dimensions as the filler structure.

The sole of the shoe 301a comprises a surrounding sole element 81. The surrounding sole element 81 establishes the contact between the shoe 301a and the ground during use of the shoe. It surrounds the ventilating container element 113 laterally and has a greater vertical extension. It extends both lower than the ventilating container element 113 and higher than the ventilating container element 113. The upper portion of the surrounding sole element 81 is located above the collar 101 of the ventilating container element 113, adjacent a lower portion of the outer material 11 that is not equipped with the netband, adjacent the membrane 13 of the upper portion 10 of the upper assembly both in a horizontal direction as well as, in a lower part, in a vertical direction, and adjacent the lower membrane 21. The material of the surrounding sole element 18 reaches these locations after having passed through the netband and the mesh material 12 as well as in and above the seam 30 during injection-moulding. In other words, the surrounding sole element 81 wraps around the corner of the upper assembly where the inside of the shoe is patterned to match a wearer's foot. The surrounding sole element 81 extends from the ground to the lower lateral sides of the upper portion 10 of the upper assembly. The surrounding sole element is attached both to the side wall 102 of the ventilating container element 113 and to a lower region of the upper portion 10 of the upper assembly. This attachment further enforces the attachment between the ventilating container element 113 and the upper assembly via connection 30, such that an overall highly stable shoe construction is provided.

The surrounding sole element 81 of the shoe 301a has lateral passages 50 allowing for air communication between the ventilating container element 113 and the lateral outside of the shoe 301a. In the exemplary embodiment of FIG. 2a, the lateral passages 50 are depicted as transverse passages being horizontal. However, the term lateral passage may not be understood in such a restricting manner. A lateral passage may be any passage that allows for an air communication between the side wall 102 of the ventilating container element 113 and a lateral outside of the surrounding sole element 81, i.e. the outside of the surrounding sole element 81 that is not the underside of the shoe 301a. In particular, the lateral passages 50 may be inclined with respect to the horizontal direction, in particular with the outer end lower than the inner end of the lateral passage. This inclination has the advantage that water can drain out more easily from the inside of the filler structure 61/surrounding sole element 81. However, horizontal lateral passages have the advantage of providing a favourable path for air and water vapour flow, particularly if a continuous passage from the right side of the surrounding sole element to the left side of the surrounding sole element or vice versa through the ventilating container element 113 and the filler structure 61 is present. The lateral passages 50 may also be inclined with the outer end being higher than the inner end of the lateral passage. This allows for creating the lateral passages, for example through drilling or by laser operation, without any danger of damaging the delicate membrane 21 of the bottom functional layer laminate 24. Moreover, air and water vapour, which are warm due to the wearer's body temperature, may effectively exit through such inclined lateral passages in a chimney-like manner.

When viewed from the bottom of the shoe, the lateral passages 50 may be in a longitudinal direction of the shoe, in a transverse direction of the shoe, or in any direction therebetween. For example, in the front or the back of the shoe, the lateral passages may be substantially in a longitudinal direction of the shoe. The orientation options described for the lateral passages 50 may be applied to all embodiments described.

The shoe 301a is produced in a several stage process. As a first step, the filler structure 61 is produced, for example through injection-moulding or casting of a polyurethane into an accordingly shaped mould. Polyurethane is one of a plurality of suitable materials that can be used in order to form the filler structure 61 and the channel structure 160 therein. Such a polyurethane filler structure has high stability to support/transfer at least a portion of the weight of the user during use, such as during walking, while having some flexibility in order to enhance the wearer's comfort during walking. Depending on the preferred use of the shoe, a suitable material can be chosen. Examples of such material are Elastollan™ from the company Elastogran Gmbh, Germany. This material is preferred due to its low density. Alternatively for injection moulding the filler element 61, TPU (Thermoplastic Polyurethane), EVA (Etylene Vinyl Acetate), PVC (Polyvinyl Chloride) or TR (Thermoplastic Rubber), etc. may be used.

The filler structure 61 is placed in the pre-formed ventilating container element 113. The comfort layer 40 is then placed on top of the filler structure 61 and the ventilating container element 113, being attached thereto using an adhesive. The bottom functional layer laminate 24, the upper functional layer laminate 17 and the outer material 10 are provided and placed in the desired position with respect to the ventilating container element 113, the filler structure 61 and the comfort layer 40. These elements are then fixed in their relative positioning through the connection 30, which connects the bottom functional layer laminate 24, the upper functional layer laminate 17, the netband 15 of the outer material 11 and the collar 101 of the ventilating container element. The connection 30 is a strobel stitch in the exemplary embodiment of FIG. 2a. It is also possibly to provide multiple connections between subsets of these elements. For example, the bottom functional layer laminate 24, the upper functional layer laminate 17 and the outer material may be connected via strobel stitch 30, whereas the ventilating container element 113 may be attached to the lower portion of the upper assembly via a local injection-moulding operation. In any case, an semi-manufactured product is formed, which comprises a plurality of originally separate elements, with all of these elements being joined to form a single composite component for further processing.

This semi-manufactured product is then placed on a last which is positioned in the desired position in a mould, wherein the surrounding sole element material is injection-moulded onto the upper assembly. In this way, the surrounding sole element 81 adheres to the upper portion 10 of the upper assembly as well as to the ventilating container element 113, such that a lasting, integral joint of these elements is achieved through the sole material of the surrounding sole element 81. Suitable materials for the surrounding sole element are polyurethane, Ethylene Vinyl Acetate (EVA), thermoplastic rubber (TR) or thermoplastic polyurethane (TPU), etc.

Sole material of the surrounding sole element 81 penetrates through the netband 15, through the strobel stitch 30, through the mesh 12, onto the upper material 11, onto the upper membrane 13, around at least a portion of the collar 101 and onto the bottom membrane 21. This penetrated sole material seals the strobel stitch 30 in a waterproof manner on the one hand and enforces the attachment between the ventilating container element 113 and the remainder of the upper assembly on the other hand. The seal provides a completely waterproof upper assembly, with the waterproof properties coming from the upper functional laminate 17 and the bottom functional layer laminate 24 surrounding the inner shoe region and being sealed in a waterproof manner to each other. The surrounding sole material also penetrates through the connection 30 to the upper side of the bottom functional layer laminate 24 and the upper functional layer laminate 17. In particular, the surrounding sole material penetrates through the space between the two laminates upwards. The surrounding sole material also penetrates somewhat in between the collar 101 and the bottom functional layer laminate 24. In this way, the whole region of the strobel stitch 30 is penetrated with surrounding sole material, such that all openings generated in the upper membrane 13 and the bottom membrane 21 through the strobel stitching operation are reliably sealed by surrounding sole material.

Although a small amount of surrounding sole material penetrates in between the collar 101 and the bottom functional layer laminate 24 for sealing purposes, the collar 101 can also have the function of providing a barrier for the sole material of the surrounding sole element 81 during its injection-moulding. The collar 101 may be positioned such that only some sole material of the surrounding sole element 81 passes the uppermost point of the collar 101, but no sole material penetrates through to the comfort layer 40 and/or the upper side of the filler structure 61. In other words, the collar 101 may prevent excess sole material from penetrating the area between the filler structure 61 and the bottom functional layer laminate 24. In this way, the water vapour permeability of a large area of the bottom functional layer laminate 24 is ensured and the breathability of the upper assembly is ensured.

The ventilating container element 113 may be placed in a mould with a suitable pressure/fixation, such that the collar 101 can fulfil the barrier function during injection-moulding of the surrounding sole element 81. In particular, a piston may exert pressure on the ventilating container element 113, through which it is pressed against the lower portion 10 of the upper assembly while the upper assembly is filled with a last. The pressure between the lower portion 10 of the upper assembly and the ventilating container element may be adapted to result in the desired amount of sole material penetrating there between. In other embodiments, particularly in case the lateral extension of the ventilating container element does not reach the connection region 30, the collar 101 may prevent any sole material from penetrating in between the ventilating container element 113 and the lower portion 20 of the upper assembly. The collar may be pressed against the lower portion 20 of the upper assembly, in the process of which a deformation of the protruding lip/collar may occur, such that a tight barrier for the subsequent injection-moulding step is formed.

In the embodiment of FIG. 2a, the netband 15 wraps around the corner of the upper portion 10, i.e. the part of the upper portion 10 where the upper functional layer laminate 17 and the netband of the upper material 11 are bent from a substantially horizontal orientation to a substantially vertical orientation. The part having a substantially vertical orientation forms the side walls for the wearer's foot. Accordingly, the sole material of the surrounding sole element 81 may penetrate through the netband 15 and onto the upper membrane from the underside and from the lateral sides. In this way, a strong, multi-directional attachment between the surrounding sole element 81 and the upper functional layer laminate 17 is achieved, as well as a good seal provided between the laminates 17, 24.

It is pointed out that it is possible that the upper material 11, the mesh 12, the upper membrane 13 and the textile lining 14 are formed as a four-layer laminate in the embodiment of FIG. 2a as well as in the other embodiments described.

Figure 2B:
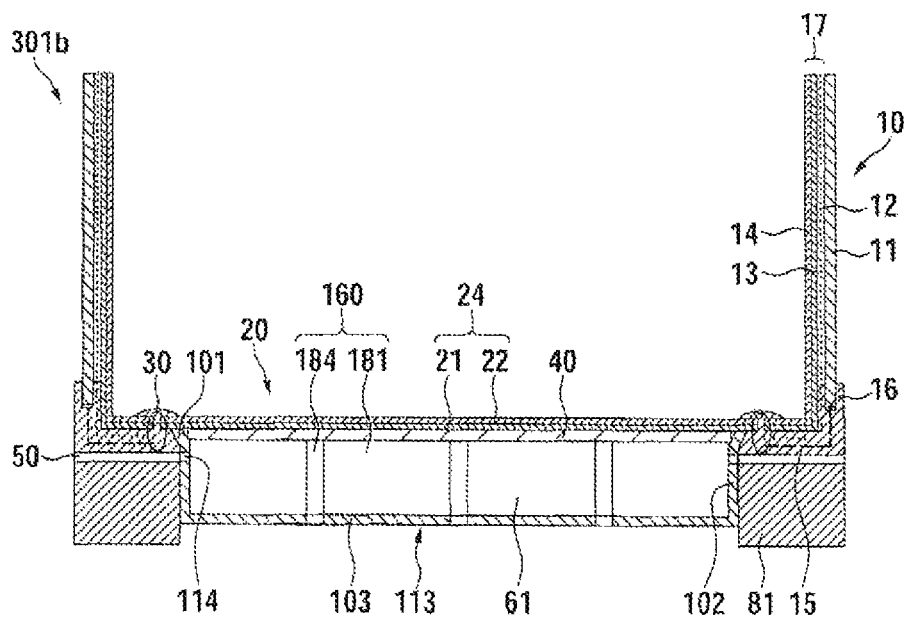
FIG. 2b is a schematic cross-sectional view of a shoe in accordance with a third embodiment of the invention.

FIG. 2b shows a cross-section through a shoe 301b according to another embodiment. Many elements of the shoe 301b are identical to the corresponding elements of the shoe 301a shown in FIG. 2a. Like or similar elements are denoted with like reference numerals, and a description thereof is omitted for brevity.

Again, a cut in a transverse direction through the upper material 11, the mesh 12, the upper membrane 13, the textile lining 14, the bottom membrane 21, the supporting textile 22, the comfort layer 40, the ventilating container element 113, the filler structure 61 and the surrounding sole element 81 is shown.

The filler structure 61 of the shoe 301b is different from the filler structure 61 of the shoe 301a. The filler structure 61 of the shoe 301b comprises longitudinal channels 184 and transverse channels 181 that extend from the upper side of the filler structure 61 to the lower side of the filler structure 61. In other words, the channels in the filler structure 61 extend along the whole height of the filler structure 61. In this way, water vapour can travel from the underside of the bottom functional layer laminate 24 to the bottom part 103 of the ventilating container element 113 in addition to the side wall 102 of the ventilating container element 113. The ventilating container element 113 has openings 114 in its bottom part 103 as well as in its side wall 102. The positions of the openings 114 in the bottom part 103 correspond to the positioning of the longitudinal channels 184, while the positions of the openings 114 in the side wall 102 correspond to the positioning of the transverse channels 181. In this way, the openings 114 allow for air communication between the channel system 160 of the filler structure 61 and the outside of the ventilating container element 113. As no sole portion is arranged below the ventilating container element 113, the openings 114 in the bottom part 103 of the ventilating container element 113 allow for direct air communication with and water vapour discharge to the environment. The openings 114 in the side wall 102 of the ventilating container element 113 are in air communication with the lateral passages 50 of the surrounding sole element 81, such that air flow to the lateral sides of the sole is established. Accordingly, water vapour can be discharged from the inside of the shoe into all directions of the ventilating container element 113.

The cross-sectional view of FIG. 2b cuts through a transverse channel 181 of the channel system 160 of the filler structure 61 of the shoe 301b. The water vapour entering the filler structure 61 from the inside of the shoe 301b partially exits the shoe at its underside via the longitudinal channels 184 and transverse channels 181 of the channel structure 160 and partially through the lateral passages 50, wherein the transverse channels 181 allow for the air communication between the channel system 160 of the filler structure 61 and the lateral passages 50. Again, the transverse channels and/or the longitudinal channels may extend over any portion of the height of the filler structure 61, particularly over the whole height or over a portion of the height extending from the top of the filler structure 61 to the inside thereof. Also, the channels in the filler structure may have any direction between the longitudinal direction of the shoe 301b and the transverse direction of the shoe 301b, when seen from its top or bottom. In other words, the channels may be oriented in any direction in the filler structure 61, when looking at a horizontal cross-section through the sole of the shoe.

It is also possible that the ventilating container element 113 of the shoe 301b does not comprise any openings in its side wall 102, such that the water vapour discharge is effected entirely through openings in the bottom part 103 of the ventilating container element 113. In this case, the lateral passages 50 in the surrounding sole element 81 can be dispensed with, i.e. the surrounding sole element 81 may be a solid structure.

The individual longitudinal blocks of the filler structure 61 may be attached to the ventilating container element 113 individually. It is also possible that transverse ribs are provided between the longitudinal blocks, such that a single piece filler structure 61 is provided, which can be placed into the ventilating container element 113 easily. In this case, the transverse ribs do not extend over the whole longitudinal length of the channels to not compromise the water vapour discharge ability of the channels.

The collar 101 of the ventilating container element 113 is positioned towards the centre of the shoe as seen from the connection 30. It is positioned in such close proximity to the bottom membrane 21 that no surrounding sole material may penetrate in between the side of the collar 101 facing the filler structure 61 and the bottom membrane 21 during the injection-moulding of the surrounding sole element 81. Accordingly, it is ensured that the entire upper surface of the filler structure 61/of the comfort layer 40 is kept free of surrounding sole material, such that a maximum untouched area for water vapour discharge is provided.

Figure 3A:
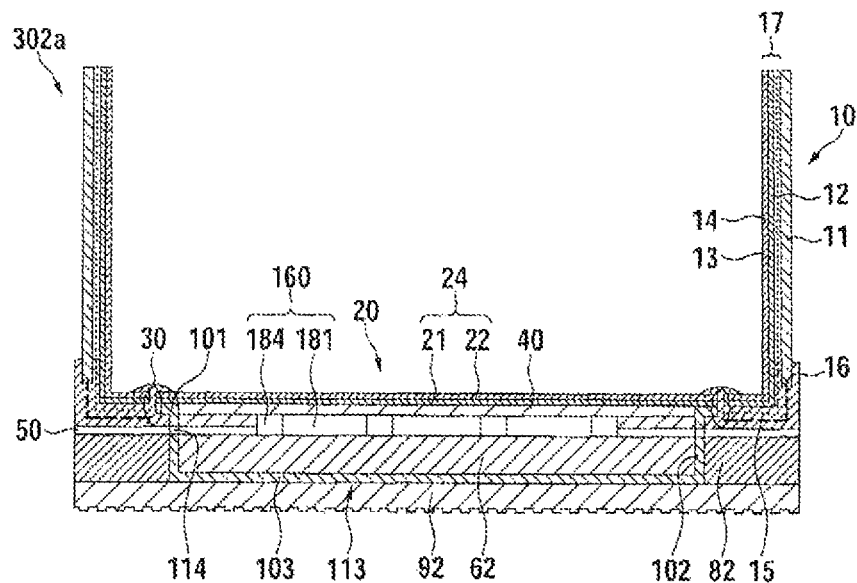
FIG. 3a is a schematic cross-sectional view of a shoe in accordance with a fourth embodiment of the invention.

FIG. 3a shows a cross-section through a shoe 302a according to another embodiment. Many components of the shoe 302a are similar or identical to the corresponding elements of the shoe 301a depicted in FIG. 2a. A description thereof is therefore omitted for brevity.

The sole of the shoe 302a comprises an outsole 92 in addition to a surrounding sole element 82. The ventilating container element 113 of the shoe 302a extends between the side walls of the surrounding sole element 82. The undersides of the ventilating container element 113 and the surrounding sole element 82 are arranged at the same height. The outsole 92 extends across the entire width of the sole of the shoe 302a. It covers both the undersides of the ventilating container element 113 and the surrounding sole element 82. The outsole 92 is the only element of the shoe 302a coming into contact with the ground during normal use of the shoe 302a on an even surface. This design has the advantage that a particularly suitable material for the outsole can be chosen independently from any requirements for the ventilating container element 113 and the surrounding sole element 82. Also, the materials of the ventilating container element 113, the filler structure 62 and the surrounding sole elements 82 may be chosen purely based on factors such as comfort for the user, stability of the sole, bonding properties during the manufacture of the shoe 302a, etc., without having to worry about the wear and tear of the sole through the continuous contact of the sole to the ground during use.

The outsole 92 has a tread structure, which is beneficial for the grip of the shoe during use. In particular, the outsole 92 is equipped with a pattern of protruding and receding portions, for improving the walking characteristics of the shoe 302a. Tread elements may be provided at the underside of the sole in all embodiments described.

The ventilating container element 113 of the shoe 302a is different from the ventilating container element 113 of the shoe 301a in that its collar 101 is horizontal. The collar 101 extends horizontally from the side wall 102 of the ventilating container element 113 to the connection 30, where it is joined with the netband of the outer material 10, the upper functional layer laminate 17 and the bottom functional layer laminate 24 via strobel stitching. With this horizontal orientation, the collar 101 has an elongated horizontal extension along the bottom membrane 22, so that an excellent trade-off between letting surrounding sole material penetrate along the upper side of the collar 101 for sealing the connection 30 and forming a barrier against the penetration of surrounding sole material onto the comfort layer 40 and/or into the channel system 160 and/or onto the bottom membrane 21 above the channel system 160 may be achieved.

Also, the filler structure 62 of the shoe 302a is different from the filler structure 61 of the shoe 301a. The filler structure 62 comprises four longitudinal channels 184 with rectangular cross-section in the depicted cross-sectional plane, the longitudinal channels 184 extending approximately 30% to 40% into the filler structure 62 from the top thereof. The longitudinal channels 184 of the shoe 302a are connected by transverse channels 181 to each other and to the openings 114 in the side wall 102 of the ventilating container element 113. The transverse channels 181, one of which is positioned and shown in the cross-sectional plane of FIG. 3a, connect the longitudinal channels 184 with each other and have the same vertical extension as the longitudinal channels 184. The transverse channels 181 do not have air and moisture discharging ports in the embodiment shown. However, the may also be provided with air and moisture discharging ports as described above. In general, many other channel structures are also possible to effect fluid communication between the top of the filler structure 62 and the ventilating container element 113, particularly the openings 114 thereof.

The comfort layer 40 of the shoe 302a extends across the entire lateral extension of the filler structure 62. It is pointed out, however, that it may also extend across the entire width of the filler structure 62 and at least portions of the upper side of the ventilating container element 113 adjacent to the filler structure 62. In this way, any discontinuities between the filler structure 62 and the ventilating container element 113, which may be present due to a particular design, such as a particular collar design, or due to manufacturing process imperfections, may be covered with the comfort layer 40, such that these discontinuities are not detrimental to the wearer's comfort. It is pointed out that the comfort layer may also extend beyond the filler structure in other embodiments shown.

Figure 3B:
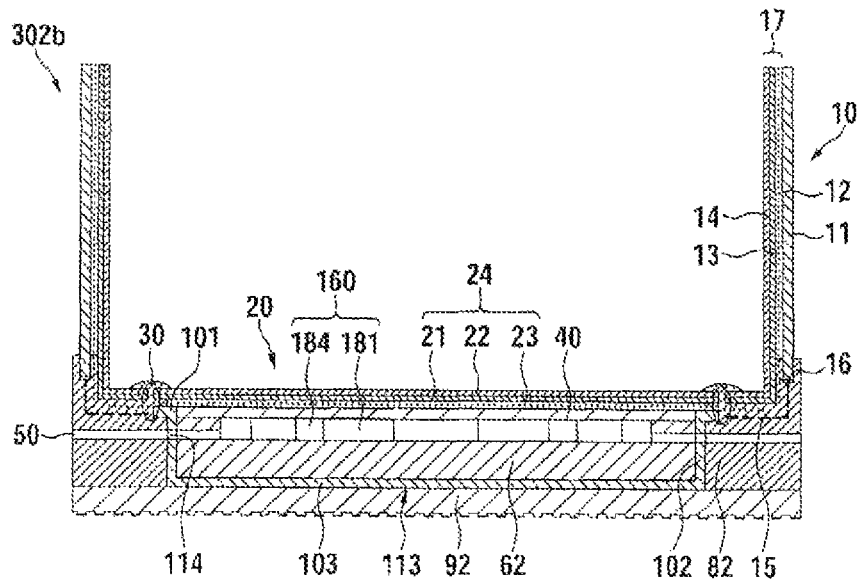
FIG. 3b is a schematic cross-sectional view of a shoe in accordance with a fifth embodiment of the invention.

FIG. 3b shows a cross-section through a shoe 302b according to another embodiment. Many elements of the shoe 302b are identical or very similar to the corresponding elements of the shoe 302a shown in FIG. 3a, with a description thereof omitted for brevity.

The bottom functional layer laminate 24 of the lower portion 20 of the upper assembly of the shoe 302b is a three-layer laminate, which comprises—from bottom to top—a mesh 23, a bottom waterproof and breathable membrane 21 and a supporting textile 22. The mesh 23 may give the bottom functional layer laminate 24 enhanced stability. It is pointed out that the bottom functional layer laminate of the other embodiments may also be the three-layer laminate, as comprised in the shoe 302b.

Figure 3C:
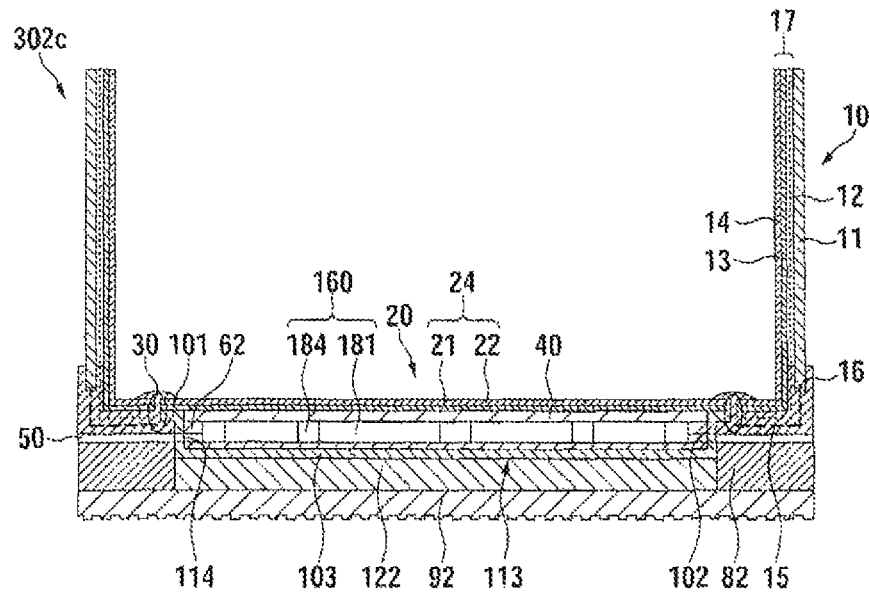
FIG. 3c is a schematic cross-sectional view of a shoe in accordance with a sixth embodiment of the invention.

FIG. 3c shows a cross-section through a shoe 302c according to another embodiment. Many elements of the shoe 302c are identical or very similar to the corresponding elements of the shoe 302a shown in FIG. 3a, with a description thereof being omitted for brevity.

The ventilating container element 113 of the shoe 302c extends in between the surrounding sole element 82 in an upper portion of the vertical extension of the surrounding sole element 82. The height extension of the ventilating container element 113 is approximately half the height extension of the surrounding sole element 82 in the portion adjacent the ventilating container element 113. Accordingly, the filler structure 62 of the shoe 302c is approximately half as high as the filler structure 62 of the shoe 302a. The channel system 160 of the filler structure 62 of the shoe 302c is similar to the channel system 160 of the filler structure 62 of the shoe 302a, shown in FIG. 3a, but has a greater lateral extension.

Below the ventilating container element 113, there is provided a sole comfort layer 122, also referred to as midsole 122. The sole comfort layer 122 is co-extensive with the ventilating container element 113 in the lateral dimension. The sole comfort layer does not comprise air communication channels in the embodiment shown in FIG. 3c, but may also comprise air communication channels in other embodiments. The two-layered design of the sole below the ventilating container element 113, i.e. the arrangement of the sole comfort layer 122 and the outsole 92 on top of each other, allows for selecting a plurality of materials highly suitable for certain tasks. In particular, the material for the outsole 92 may be selected based on its grip and abrasion properties, and the material for the sole comfort layer 122 may be selected based on its comfort and cushioning capabilities. As these sole elements fulfil a plurality of tasks of the lower portion of the shoe, the materials for the combination of the ventilating container element 113 and the filler structure 62 may be selected based its ability to provide stability while having a channel structure provided for air flow therein. The elements discussed may be attached to each other through gluing, injection-moulding or other suitable techniques.

It is pointed out that the openings 114 in the ventilating container element 113 are not required to have matching dimensions to the adjacent lateral passages 50 for providing effective air flow therethrough. However, matching dimensions are favourable.

Figure 3D:
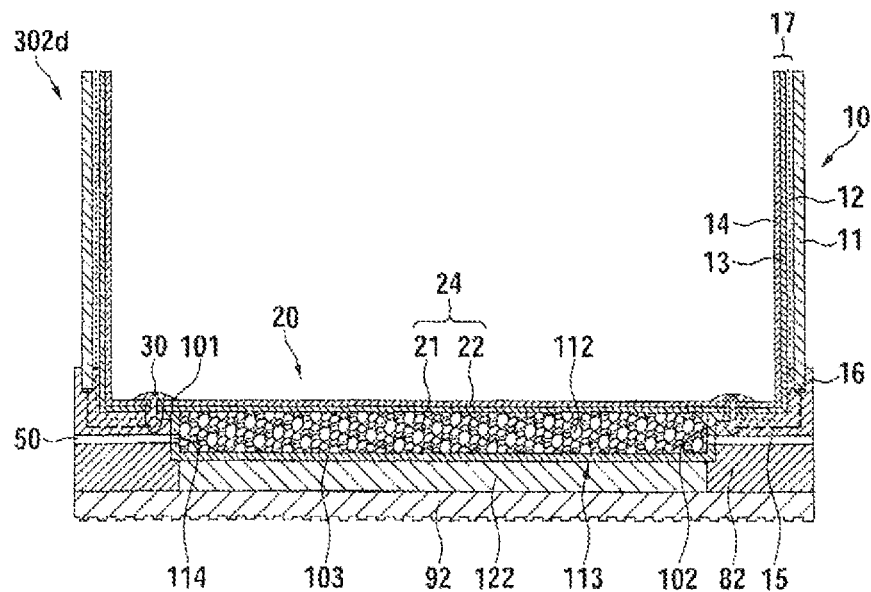
FIG. 3d is a schematic cross-sectional view of a shoe in accordance with a seventh embodiment of the invention.

FIG. 3d shows a cross-section through a shoe 302d according to another embodiment. Many elements of the shoe 302d are identical to the corresponding elements of the shoe 302c shown in FIG. 3c, with a description thereof being omitted for brevity.

The ventilating container element 113 of the shoe 302d is filled with a filler material 112 allowing for air flow through it, such as a porous material. The filler material 112 extends through the whole volume of the ventilating container element 113. The filler material 112 allows for air communication between the underside of the bottom functional layer laminate 24 and openings 114 in the side wall 102 of the ventilating container element 113.

In general, the filler material or structure 112 may be any material or structure suitable for allowing air communication and for supporting a desired portion of the wearer's weight during use of the shoe. An exemplary structure may be comprised of a number of filler elements placed in the container element 113, such that air flow can take place in the voids in between the filler elements. Examples for such elements are spherical shapes. The elements may be made of a material which is either porous or non-porous. Water may also pass through the voids between the filler elements.

Alternatively, the filler material or structure 112 may be a continuous, three-dimensionally formed open or porous material or structure, such as a spacer, having inherent air permeable properties. Examples of such materials are foamed polyurethanes PoliYou® or PoliSport® commercially available from Kun Huang Enterprises Co., Ltd, Taiwan.

It is pointed out that the filler structures of other embodiments may also be substituted with the filler material or structure 112.

It is further pointed out that it is also possible that the side wall 102 and/or the bottom part 103 of the ventilating container element 113 are made of a material allowing for air flow through it, e.g. an open or porous material, such that an air flow can take place between the inner space of the ventilating container element 113 and its outside. In this case, no openings have to be provided in its bottom part 103 and/or its side wall 102. The provision of such a ventilating container element formed of material allowing for air flow through it may be applied to all other embodiments discussed as well.

The shoe 302d does not comprise a comfort layer on top of the filler material 112. It is, however, pointed out that a comfort layer, as discussed above, may also be present in the embodiment of the shoe 302d, arranged above the filler material 112 and potentially above at least portions of the collar 101 of the ventilating container element 113. It is also pointed out that the comfort layer may be dispensed with in the other embodiments described.

Figure 3E:
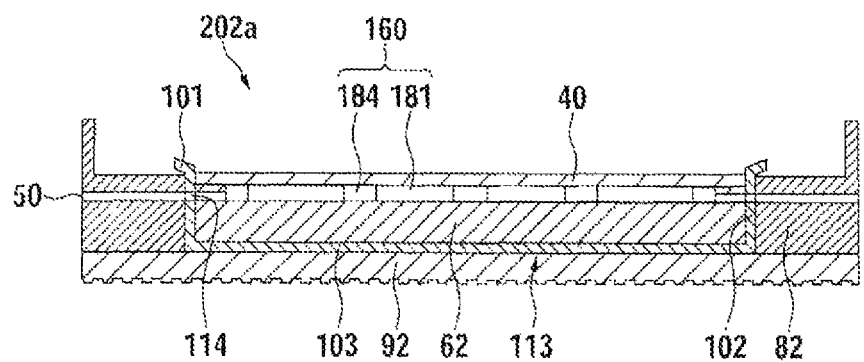
FIG. 3e is a schematic cross-sectional view of a sole assembly in accordance with an eighth embodiment of the invention.

FIG. 3e shows a cross-section through a sole assembly 202a in accordance with another embodiment. The sole assembly 202a comprises an outsole 92, a surrounding sole element 82 provided with lateral passages 50, a ventilating container element 113 having a bottom part 103 and a side wall 102 forming an inner space therein, a filler structure 62 placed in the inner space of the ventilating container element 113 and having a channel structure 160, and a comfort layer 40. The elements of the sole assembly 202a correspond to the respective elements of the shoe 302a shown in FIG. 3a. Accordingly, a detailed description is omitted for brevity. However, the elements of the sole assembly 202a may be joined together in the arrangement depicted, such that a well-defined semi-manufactured product for a shoe is formed. Said semi-manufactured product may be readily combined with a wide variety of upper assemblies, such that a shoe with a breathable sole structure is formed. The upper assembly only needs to fulfil the requirement of having a breathable underside or lower portion, such that water vapour discharge from the inside of the shoe through the channel structure 160 and the lateral passages 50 to the outside of the sole is ensured. The attachment between the sole assembly 202a and an upper assembly may be achieved by gluing, injection-moulding or any other suitable attachment technique.

Figure 4:
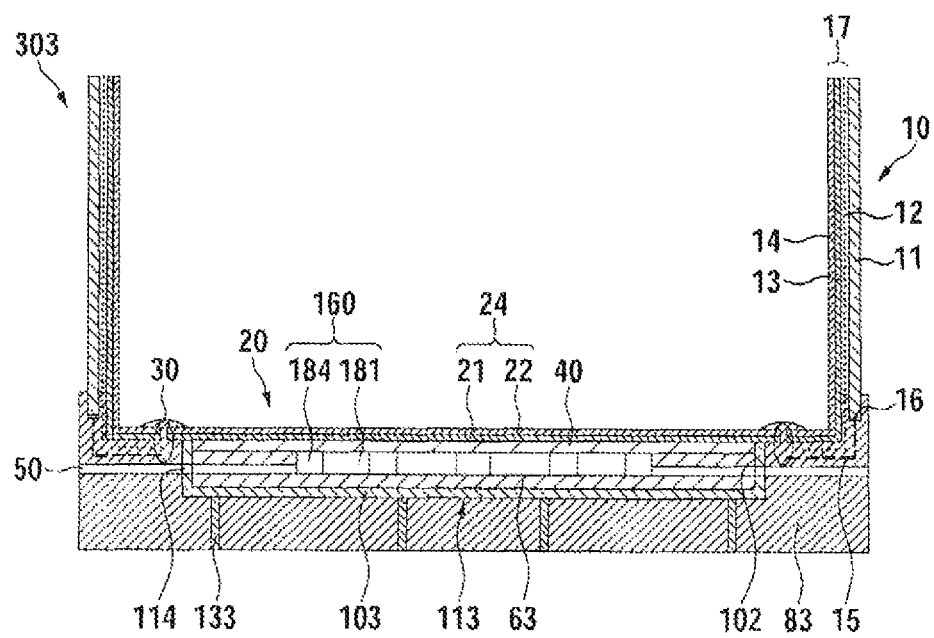
FIG. 4 is a schematic cross-sectional view of a shoe in accordance with a ninth embodiment of the invention.

FIG. 4 shows a cross-section through a shoe 303 according to another embodiment. The upper portion 10 of the upper assembly, the lower portion 20 of the upper assembly and the connection 30 thereof, the comfort layer 40, and the filler structure 63 are identical or very similar to the corresponding elements of the shoe 302c, shown in FIG. 3c. A description of these elements is omitted for brevity.

The ventilating container element 113 of the shoe 303 does not comprise a collar. The ventilating container element 113 consists of only the bottom part 103 and the side wall 102 forming the inner space for receiving the filler structure 63 and, in the exemplary embodiment of FIG. 4, the comfort layer 40. In other words, the ventilating container element 113 is a mere container for the filler structure 63, surrounding the filler structure 62 with a wall/bottom without additional features.

The ventilating container element 113 may be attached to the lower portion 20 of the upper assembly in the injection-moulding step for forming the surrounding sole element 83 or in a separate injection-moulding step forming a local attachment between the ventilating container element 113 and the lower portion 20 or else by sewing or gluing it to the upper assembly.

The surrounding sole element 83 surrounds the ventilating container element 113 laterally and passes underneath the ventilating container element 113. In other words, the surrounding sole element 83 surrounds the outsides of the bottom part 103 and the side wall 102 of the ventilating container element 113. The ventilating container element 113 is embedded into the surrounding sole element 83. The surrounding sole element 83 is also arranged below the substantially horizontal portion of the upper assembly laterally adjacent to the ventilating container element 113 as well as laterally around a lower region of the side wall of the upper assembly part receiving the wearer's foot. This may be seen as the surrounding sole element 83 being attached to the lower portion of the upper assembly, with lower portion being used as a general term describing the lower region of the part of the assembly for receiving the wearer's foot, as discussed above.

Again, the surrounding sole element 83 is provided with lateral passages 50 for effecting water vapour discharge along with air discharge from the filler structure 63 through the ventilating container element 113 and through the lateral passages 50 to the lateral outside of the sole of the shoe 303.

The surrounding sole element 83 comprises supporting members 133. The supporting members 133 extend vertically through the surrounding sole element 83. They are positioned below the ventilating container element 113. In the present embodiment, the surrounding sole element 83 comprises four supporting members 133 equally spaced below the ventilating container element 113. Depending on their extension in the longitudinal direction of the shoe 303, the supporting members 133 may be ribs or stilts. In other words, the supporting members 133 may have longitudinal extensions substantially equal to their transverse extensions, shown in FIG. 4, or may have longitudinal extensions substantially larger than their transverse extensions. In another embodiment, the supporting members may be formed as transverse ribs.

The supporting members 133 may be manufactured as follows. The supporting members 133 may be made from the same material as the ventilating container element 113. In this case, the ventilating container element 113 and the supporting members 133 may be injection-moulded integrally in one injection-moulding step. Accordingly, the surrounding sole element 83 may then be injection-moulded around the ventilating container element 113 and the supporting members 133 in a subsequent injection-moulding step. It is also possible that the supporting members 133 are manufactured separately. In this case, they may either be attached to the ventilating container element 113 or may be kept in a fixed position with respect to the ventilating container element 113 in a mould, before the surrounding sole element 83 is injection-moulded.

The supporting members 133 keep the ventilating container element 113 elevated to allow the surrounding sole element material 83 to flow underneath the ventilating container element 63 during injection moulding.

FIG. 5a shows a cross-section through a shoe 304a according to another embodiment. Many elements of the shoe 304a are identical to the respective elements of the shoe 303, with a description thereof being omitted for brevity.

The ventilating container element 113 of the shoe 304a has a varying lateral extension from its upper end to its lower end. At its upper end, the ventilating container element 113 extends across about 60-70% of the width of the shoe 304a in the transverse direction shown. This lateral extension is constant over approximately the upper half of the height extension of the ventilating container element 113. Below that, i.e. over the lower half of the height extension of the ventilating container element 113, the ventilating container element 113 extends across almost the entire transverse extension of the shoe 304a. Accordingly, the side wall 102 of the ventilating container element 113 has a step-like shape.

The filler structure 64 fills the entire inner space provided by the ventilating container element 113. The channel structure 160 of the filler structure 64 is similar to the channel structure 160 of the shoe 302b, shown in FIG. 3b. The ventilating container element 113 may also be filled with a filler material or with a plurality of filler elements, which may be poured into the ventilating container element 113 and may then find their way into the lower lateral pockets provided in the ventilating container element 113 through the side wall shape. It is also possible to fill the ventilating container element 113 with a filler structure 64, as shown, with the lower, more extensive portion of the filler structure being squeezed into the lower lateral pockets, which is possible due to the elasticity of the filler structure 64.

The surrounding sole element 84 forms a sole element surrounding the side wall 102 at the wider portion of the ventilating container element 113. It also covers the outside of the bottom part 103 of the ventilating container element 113, thereby forming the contact surface of the shoe 304a with the ground. The surrounding sole element 84 also fills the lateral pocket between the ventilating container element 113 and the upper portion 10/lower portion 20 of the upper assembly, thereby effecting a strong attachment between these components and a waterproof seal between the upper portion 10 and the lower portion 20 of the upper assembly.

The surrounding sole element 84 has lateral passages 50, which are in air communication with the channel system 160 of the filler structure 64. The lateral passages 50 are arranged somewhat above the change in lateral extension of the ventilating container element 113.

The surrounding sole element 84 comprises supporting members 134 arranged below the ventilating container element 113. The surrounding sole element 84 is provided with a tread structure.

The design of the shoe 304a ensures that the cushioning and comfort capacities of the filler structure 64 are taken advantage of over a large volume, while the complete surrounding of the ventilating container element 113 by the surrounding sole element 84 allows for a uniform optical appearance of the shoe and for the provision of a durable outer material across all outer walls of the sole.

Moreover, the design of the shoe 304a allows for a small amount of sole material being needed for the surrounding sole element 84. The high volume ventilating container element 113 is produced separately, and the surrounding sole element 84 can then be produced in a quick, well-controlled injection moulding step. This step may be the last step in finishing the shoe manufacturing.

FIG. 5b shows a cross-section through a shoe 304b according to another embodiment. Many elements are identical or similar to the respective elements described with respect to previous embodiments, with a description thereof being omitted for brevity.

The upper assembly of the shoe 304b comprises an upper portion 10, comprising an upper material 11 and an upper functional layer laminate 17, a lower portion 20, comprising a bottom functional layer laminate 24, a ventilating container element 113, a filler structure 64 placed in the ventilating container element 113 and a comfort layer 40 placed on top of the filler structure 64.

The bottom functional layer laminate 24 extends across the entire horizontal portion of the upper assembly associated with the wearer's sole. It also extends somewhat up the side walls of the upper assembly associated with the wearer's foot's side portions. The upper functional layer laminate 17 does not extend all the way down to the transition from said side walls to said horizontal portion. The netband 15 of the upper material 11, may extend as far down as the upper functional layer laminate 17 or further down than the upper functional layer laminate 17. In the exemplary embodiment of FIG. 5b, the netband 15 extends down to the bottom end of said side walls associated with the wearer's foot's side portions. The upper functional layer laminate 17 and the bottom functional layer laminate 24 are brought close together with their respective edges, with a strobel stitch 30 connecting these components in the exemplary embodiment of FIG. 5b. The strobel stitch 30 also attaches the netband 15 to these components.

The ventilating container element 113, which is arranged below the bottom functional layer laminate 24 and the comfort layer 40, extends across most of the horizontal portion of the bottom functional layer laminate 24. In this way, advantage is taken of the additional space available due to the connection 30 being positioned in the side wall of the upper assembly.

The ventilating container element 113 has a collar 101 that extends upwards at a slight angle with respect to the vertical direction. The collar 101 is angled outwards with respect to the side wall of the ventilating container element 113. In this way, the collar provides a highly effective barrier against ingress of material of surrounding sole element 84 during injection. Furthermore, due to the outward angle of collar 101, the cross-section of the inner space of the ventilating container element 113 is slightly increased in its upper portion. Accordingly, the area of the bottom functional layer laminate 24 that contributes to water vapour discharge from the inside of the shoe 304b to the filler structure 64 placed in the ventilating container element 113 is maximized. The filler structure 64 and the comfort layer 40 are adapted to the increasing cross-section of the ventilating container element 113 in its upper portion. The increasing cross-section of the ventilating container element 113 may be present in all cross-sections through the shoe 304b or in only a subset thereof. In other words, the cross-sectional dimension of the ventilating container element 113 may be constant across its height extension in other cross-sections.

In more general words, the cross-sectional dimension of the ventilating container element 113 may vary along its vertical extension. This varying may be different for different cross-sections.

The channel structure 160 of the filler structure 64 of the shoe 304b substantially corresponds to the channel structure 160 of the filler structure 64 of the shoe 304a, shown in FIG. 5a. Providing the ventilating container element 113 over most of the lateral dimension of the shoe 304b has the advantage that the high water vapour discharge capabilities of the bottom functional layer laminate 24 may be taken advantage of over a large area.

The surrounding sole element 84 surrounds the side walls of the ventilating container element 113 as well as a portion of the underside of the bottom functional layer laminate 24 as well as a lower end of the upper functional layer laminate 17 and the outer material 11. The sole material of the surrounding sole element 84 is penetrated through the netband 15 and through the strobel stitch 30, thereby sealing the connection region between the upper portion 10 and the lower portion 20 of the upper assembly.

Underneath the ventilating container element 113 and the surrounding sole element 84, an outsole 94 is provided.

FIG. 6a shows a cross-section through a shoe 305a according to another embodiment. The outer material 11, the upper functional layer laminate 17, the bottom functional layer laminate 24 and the connection 30 of these elements are almost identical to the respective elements of the shoe 304b, such that a description thereof is omitted for brevity.

However, the shoe 305a—as well as the shoes 305b, 306a and 306b, shown in FIGS. 6b, 7a and 7b—is very different from the shoe discussed previously, because the ventilating container element 113 is not surrounded laterally by a surrounding sole element, but extends across the entire lateral extension of the shoe in this lower region of the shoe.

The ventilating container element 113 is provided with openings 114 in its side wall 102. The openings 114 are in direct air communication with the environment, in particular with the lateral outside of the lower part of the shoe 305a. In this way, a highly effective water vapour discharge from the inside of the shoe through the ventilating container element 113 is achieved.

The shoe 305a comprises an outsole 95, which is arranged below the ventilating container element 113, is co-extensive therewith in the lateral extension and also extends across the whole lateral extension of the shoe 305a in its lower region. As an optional element, the outsole comprises a tread structure.

A filler structure 65 is placed in the inner space of the ventilating container element 113 formed by its bottom part 103 and side wall 102. The filler structure 65 comprises a channel system 160, to which water vapour is discharged from the inside of the shoe 305a through the bottom functional layer laminate 24. The water vapour discharge from the inside of the shoe takes place across substantially the entire horizontal portion of the inside of the shoe 305a, because the bottom functional layer laminate 24 and the channel structure 160 of the filler structure 65 extend across substantially this entire horizontal portion.

A comfort layer 40 is disposed between the bottom functional layer laminate 24 and the filler structure 65.

A surrounding connection element 85 surrounds a lower portion/region of the upper assembly of the shoe 305a and covers a lateral end portion of the upper surface of the ventilating container element 113. The surrounding connection element 85 is attached to both the upper assembly and said lateral end portion of the upper surface of the ventilating container element 113. In this way, an attachment between the the upper assembly and the ventilating container element 113 is effected by the surrounding connection element 85. The surrounding connection element 85 may be injected onto the ventilating container element 113. The surrounding connection element 85 may be the only form of attachment between the upper assembly and the ventilating container element 113. Additionally, however, the ventilating container element 113, potentially including the comfort layer 40, may be glued or attached in another way to the upper assembly.

The material of the surrounding connection element 85 is penetrated through the netband 15 and onto the connection region 30 between the upper portion 10 and the lower portion 20 of the upper assembly of the shoe 305a. In this way, the surrounding connection element 85 forms a waterproof seal at the connection region 30, in particular at the strobel stitch 30.

The surrounding connection element 85 has a lateral protrusion extending beyond the lateral extension of the ventilating container element 113. This additional sole material helps in taking on the stresses induced into the surrounding connection element 85 during use, such that a highly durable construction is achieved.

It is also possible that the connection 30 between the bottom functional layer laminate 24 and the upper functional layer laminate 17 may be sealed in another way, for example via a sealing tape. In that case, the surrounding connection element 85 may be injected only for the purpose of attaching the ventilating container element 113 to the upper assembly.

FIG. 6b shows a cross-section through a shoe 305b according to another embodiment. Shoe 305b is identical to shoe 305a, with the exception of the surrounding connection element 85. The surrounding connection element 85 of the shoe 305b covers the upper circumferential edge of the ventilating container element 113, covering a lateral end portion of the upper surface of the ventilating container element 113 and a side wall portion of the ventilating container element 113 above the openings 114 in the side wall 102 of the ventilating container element 113. In this way, a multi-directional, strong attachment between the lower portion of the upper assembly and the ventilating container element 113 is achieved. The ventilating container element 113 of the shoe 305b forms the outer sole of the shoe. A separate outsole is not provided in this exemplary embodiment. It is, however, also possible to provide a separate outsole.

FIG. 7a shows a cross-section through a shoe 306a according to another embodiment.

The upper assembly of the shoe 306a comprises an upper portion 10 having an upper material 11 and an upper functional layer laminate 17, as described above, and a lower portion 20 having a breathable or perforated insole 25 and a bottom functional layer laminate 24. The bottom functional layer laminate 24 comprises, from top to bottom, a waterproof and breathable lower membrane 21 and a supporting textile 22. The upper functional layer laminate 17 is connected to the insole 25 via strobel stitch 30. The bottom functional layer laminate 24 is glued onto the upper functional layer laminate 17 from the bottom via a waterproof adhesive sealant 28. The waterproof adhesive sealant 28 penetrates the mesh 12, such that a waterproof seal between the lower membrane 21 and the upper membrane 13 is effected via the waterproof adhesive sealant 28. In this way, a waterproof, breathable upper assembly is formed. The bottom functional layer laminate 24 may also be a three-layer laminate having a mesh on top of the lower membrane 21, with the waterproof adhesive sealant 28 penetrating this mesh and providing for a waterproof seal between the two membranes. Also, the bottom functional layer laminate 24 may have the supporting textile 22 arranged on top of the lower membrane 21, with the supporting textile being adapted to be penetrated by the waterproof adhesive sealant 28. The upper material 11 is glued to the lower surface of the bottom functional layer laminate 24 via lasting glue 26, with the overlapping portion of the upper material 11 being positioned below the bottom functional layer laminate 24.

The insole 25 may also be omitted and the upper functional layer laminate 17 sewn or glued to the bottom functional layer laminate 24 in such a way that the connecting region between the laminates is sealed in a waterproof manner, e.g. using a waterproof sealant or injecting a sealing material on to the connecting region such that it penetrates into and around the seam or using a waterproof seam tape.

Or else the insole may be placed below the laminates connected together in a waterproof manner.

The shoe 306a further comprises a ventilating container element 113 and an outsole 96. The outsole 96 is arranged below the ventilating container element 113 substantially across its entire lateral extension. The ventilating container element 113 comprises a filler material 112 that allows for air flow through it. Instead of the filler material 112, there may also be provided a filler structure having a channel system, as described above. The ventilating container element 113 comprises openings 114 in its side wall 102, through which air communication between the filler material 112 and the outside of the ventilating containing element 113 is established. As the ventilating container element extends across the entire lateral extension of the shoe 306a, the openings 114 in the side wall 102 of the ventilating container element 113 allow for an air flow between the filler material 112 and the lateral environment of the shoe 306a. A water vapour discharge path from the inside of the shoe through the insole 25, through the bottom functional layer laminate 24, through filler material 112 and through the openings 114 in the side wall 102 of the ventilating container element 113 is formed.

The ventilating container element 113 is glued to the upper assembly via sole adhesive or cement 27. The sole adhesive is arranged between upper circumferential portions of the ventilating container element 113, i.e. portions of the upper surface of the ventilating container element 113 close to the side wall 102, and a lasted portion of the upper material 11.

FIG. 7b shows a cross-section through a shoe 306b according to another embodiment. The ventilating container element 113, the filler material 112 and the outsole 96 are identical to the shoe 306a, shown in FIG. 7a.

However, the upper assembly of the shoe 306b is different from the upper assembly of the shoe 306a. The upper assembly of the shoe 306b comprises a waterproof and breathable membrane 18, which is arranged over the entire inner surface of the upper assembly. The membrane 18 is a three-dimensional membrane/functional layer that forms a waterproof, breathable bag around the wearer's foot. The membrane 18 extends over the upper portion 10 as well as the lower portion 20 of the upper assembly, In particular, it extends over the side portions of the upper assembly as well as over the substantially horizontal portion of the upper assembly associated with the underside of the wearer's foot. The membrane 18 is glued to an insole 25, which is arranged below the membrane 18 in the substantially horizontal portion of the upper assembly, via adhesive 28. Adhesive 28 may be used perimetrically, as shown in FIG. 7b, or spotwise or across the entire extension of the insole 25, provided a breathable adhesive is used. The upper assembly also comprises outer material 11, which is lasted over the lateral ends of the insole 25 and glued thereto via lasting glue 26. Again, the ventilating container element 113 is glued to the upper assembly via sole adhesive 27.

It is pointed out that instead of membrane 18, a functional layer laminate may be used, with the functional layer laminate comprising a waterproof, breathable membrane and a supporting textile and/or a mesh.

In the embodiment of FIG. 7b, the functional layer arrangement, which extends over the upper portion 10 and the lower portion 20 of the upper assembly, is comprised of one functional layer (or one functional layer laminate) only. In the embodiments described before, a functional layer arrangement is formed by the upper membrane 13 and the bottom membrane 21, in particular by the upper functional layer laminate 17 and the bottom functional layer laminate 24.

In the embodiments described, a number of modifications may be made, as is apparent to a person skilled in that art.

For example, it is pointed out that the upper assembly does not have to be waterproof for the advantageous effects of the breathable lower portion of the shoe according to the invention to be present. The ventilating container element with or without surrounding or other sole elements may also be applied to shoes which are not waterproof.

As another example for a modification, instead of injection-moulding, other techniques can be used for manufacturing the sole elements of the embodiments described above. For example, the filler structure having a channel system may also be poured into a mould in a casting process. Vulcanizing is another well-known sole production process.

Another exemplary modification relates to the two-layer bottom functional layer laminate described. It is also possible to provide a three-layer bottom functional layer laminate having a third layer below or above the lower membrane. If a sole element or attachment means is injection moulded the third layer may be placed below the membrane and comprise a mesh or another suitable material that allows penetration of material therethrough during injection-moulding, such that a seal between the lower membrane to the upper membrane may be effected. It is also possible to provide the two-layer bottom functional layer laminate with a supporting textile instead of a mesh below or above the lower membrane, with the supporting textile being adapted to be penetrated by sealing/attachment material during injection-moulding or else by adhesive or sealant during gluing together of the upper and bottom laminates to ensure that a waterproof seal is achieved between the two functional layers.

Also, depending on the specific stability requirements of a shoe, the thickness and material of the ventilating container element may be chosen accordingly. In one extreme, the ventilating container element may be a load bearing structure for the wearer's weight. In the other extreme, it may be a mere border for functional and clear separation between the inside of the ventilating container element and the outside thereof. Also, the filler structure or material plays a role in the stability of this core portion of the shoe, such that the thickness and material chosen for the ventilating container element may also be selected depending on the respective filler structure or material.

Also, there are many modifications to manufacturing an upper assembly/sole assembly/shoe in accordance with the invention. An exemplary method is as follows.

A filler structure is premade in a separate process. The filler structure may be a closed cell polyurethane grid with ventilation channels. A so called PU blocker is placed on top of a bottom piston of a mould or, alternatively, a special bottom piston is used instead of the PU blocker. The PU blocker is a tool, or more precisely a placeholder, which controls the flow of polyurethane to desired regions inside the mould. The ventilating container element, with the filler structure placed therein, is placed on top of the PU blocker. A last with the remainder of the upper assembly is lowered into the mould, and the mould closes. In a first injection step with polyurethane, the ventilating container element is adhered to the remainder of the upper assembly by the polyurethane, which seals/fixates the collar of the polyurethane ventilating container element to either the 2-layer laminate and/or to the netband. In a top view, the polyurethane seal from the first injection describes an elongated O corresponding to the shape of the collar around the ventilating container element. The ventilating container element is not fully embedded in polyurethane by the first injection, only the collar is covered by polyurethane. In an exemplary embodiment, the netband is 8 millimeters wide, with the polyurethane from the first injection step covering 4 millimeters thereof. In another variation, the polyurethane seals between collar and the bottom 2-layer laminate only. Next, the mould opens, the last with the upper assembly is raised, with the ventilating container element being adhered to the remainder of the upper assembly. Accordingly, the upper assembly is finished at this point. The PU blocker is removed from the mould. A rubber outsole is put on top of the bottom piston in the mould. The last with the upper assembly is lowered, the mould with pins in the side frames closes again, and a second PU injection is performed creating the surrounding sole element. The air flow ducts through the lateral passages and the openings in the ventilating container element may be created or refined with a laser or mechanically with a robot holding a hot needle or some other means of thermally removing material from the wall of the ventilating container element.

Another exemplary modification is that the openings and/or the at least one lateral passage can be provided with inserts that can be removed before first use. In particular, the inserts may be connected to the material around the openings or lateral passages, in particular to the ventilating container element and/or to the surrounding sole element. However, such attachment may be weak, for example only comprising local attachment points, such that a wearer may remove the inserts by hand. In this way, it is ensured that the openings or lateral passages remain free of dirt during the shipping and selling process, but that the openings or lateral passages can be easily completed by the user. These attached inserts may, for example, be achieved by providing the mould for moulding the surrounding sole element with hollow pins that do not extend the whole length of the later to be formed lateral passage of the shoe. In such a way, an insert is formed that is connected to the surrounding sole element at its inner end. The attachment region, i.e. the delta between then length of the pin and the extension of the lateral passage, can be chosen in such a way that the user can break this attachment by pulling the insert. Another way of manufacturing such attached pins is to form a solid ventilating container element and/or surrounding sole element, i.e. without openings or lateral passages, and to cut along the outer perimeter of the openings and/or lateral passages into the ventilating container element and/or the surrounding sole element, while not taking away the material in the inner region of the later to be formed openings or lateral passage. The cutting along the perimeter is done is such a way that the user can remove the remaining material in the openings or lateral passage with little effort.

Definition of Functional Layer/Membrane

A functional layer is a water vapour-permeable and waterproof layer, for example, in the form of a membrane or a correspondingly treated or finished material, for example, a textile with plasma treatment. Both the lower functional layer, also referred to as lower membrane, and the upper functional layer, also referred to as upper membrane, can be parts of a multilayer, generally a two-, three- or four-layer laminate; the lower functional layer and the upper functional layer are sealed so as to be waterproof in the lower area of the shaft arrangement on the sole side; the lower functional layer and the upper functional layer can also be formed from one material.

Appropriate materials for the waterproof, water-vapour-permeable functional layer are especially polyurethane, polyolefins, and polyesters, including polyether esters and laminates thereof, as described in documents U.S. Pat. No. 4,725,418 and U.S. Pat. No. 4,493,870. In one variant. the functional layer is constructed with microporous, expanded polytetrafluoroethylene (ePTFE), as described, for example, in documents U.S. Pat. No. 3,953,566 and U.S. Pat. No. 4,187,390, and expanded polytetrafluoroethylene provided with hydrophilic impregnation agents and/or hydrophilic layers; see, for example, document U.S. Pat. No. 4,194,041. Microporous functional layers are understood to mean functional layers whose average effective pore size is between 0.1 and 2 m, preferably between 0.2 m and 0.3 m.

Definition of Laminate

A laminate is a composite consisting of several layers permanently joined together, generally by mutual gluing or sealing. In a functional-layer laminate, a waterproof and/or water vapour-permeable functional layer is provided with at least one textile layer. Here, we speak of a two-layer laminate. A three-layer laminate consists of a waterproof, water-vapour-permeable functional layer embedded in two textile layers. The connection between the functional layer and the at least one textile layer occurs by means of a discontinuous glue or adhesive layer or a continuous water-vapour-permeable glue layer. In one variant, a glue can be applied spot-wise between the functional layer and the one or two textile layers. Spot-wise or discontinuous application of glue occurs because a full-surface layer of a glue that is not water vapour-permeable itself would block the water-vapour permeability of the functional layer.

Definition of Waterproof

A functional layer/functional-layer laminate is considered "waterproof," optionally including the seams provided on the functional layer/functional-layer laminate, if it guarantees a water-entry pressure of at least $1 \cdot 10^4$ Pa. The functional-layer material preferably withstands a water-entry pressure of more than $1 \cdot 10^5$ Pa. The water-entry pressure is then measured according to a test method in which distilled water at 20 2° C. is applied to a sample of 100 cm$^2$ of the functional layer with increasing pressure. The pressure increase of the water is 60 3 cm H$_2$O per minute. The water-entry pressure then corresponds to the pressure at which water first appears on the other side of the sample. Details concerning the procedure are stipulated in ISO standard 0811 from the year 1981.

Whether a shoe is watertight can be tested, for example, with a centrifuge arrangement of the type described in U.S. Pat. No. 5,329,807.

Definition of Water Vapour Permeable/Breathable

A functional layer/functional-layer laminate is considered "water-vapour permeable" if it has a water-vapour-permeability number Ret of less than 150 m$^2$ Pa W$^{-1}$. Water-vapour permeability is tested according to Hohenstein skin model. This test method is described in DIN EN 31092 (02/94) and ISO 11092 (1993).

Definition of Allowing for Air Flow/Communication of Air

Air flow is dependent on the pressure gradient, the temperature gradient and the gradient of water vapour concentration. The terms "allowing for air flow through it" and "communication of air" mean that a bulk air transfer already takes place at a minimal pressure difference (<1000 Pa, particularly <100 Pa, more particularly <10 Pa, but greater than or equal to 1 Pa), for example due to minimal wind, due to a motion of the foot or due to a walking motion. A channel structure, a spacer material or the voids between discrete filler elements are structures/materials allowing for air flow through it. In contrast thereto, almost every material allows for an airflow therethrough at high pressures, which is not meant by the terminology used. Water vapour may diffuse through certain materials at low pressures, such as through microporous materials or through air. However, such a diffusing is by itself not sufficient to constitute a discharge through the filler structure or material in the sense of the invention. An air flow is needed, which takes the water vapour with it out of the shoe. Also, "unloaded" air is flown into the shoe, which can in turn absorb water vapour within the filler structure or material and transport it to the outside of the shoe. A diffusing of water vapour through the materials of the filler structure or material may be advantageous, but is not sufficient for establishing an air flow in the sense of the invention.

The invention claimed is:

1. Shoe comprising:
   an upper assembly comprising an upper portion having an outer material for surrounding a foot and a lower portion having a breathable, waterproof functional layer laminate having at least a waterproof, breathable membrane, wherein the upper assembly comprises an insole and wherein the insole is arranged below the breathable, waterproof functional layer laminate; and
   a sole comprising:
      a ventilating container element having a bottom part and a side wall surrounding said bottom part so as to form an inner space of the ventilating container element, the ventilating container element being arranged below and attached to the upper assembly; and
      a filler structure or material allowing for air flow through it placed in the inner space of the ventilating container element,
      wherein the ventilating container element is provided with openings in its side wall, and
   wherein the shoe allows for transfer of water vapour from an inside of the shoe to an outside thereof, with water vapour being discharged through the breathable, waterproof functional layer laminate of the lower portion of the upper assembly, through the filler structure or material, and through the ventilating container element.

2. Shoe according to claim 1, wherein the ventilating container element has, at least in a top portion thereof, a smaller perimeter than the lower portion of the upper assembly.

3. Shoe according to claim 1, wherein the ventilating container element is attached to the upper assembly by adhesive.

4. Shoe according to claim 1, wherein the ventilating container element is stitched to the upper assembly.

5. Shoe according to claim 1, wherein the ventilating container element is attached to the upper assembly by a material moulded or injected on parts of the upper assembly and the ventilating container element.

6. Shoe according to claim 1, wherein the ventilating container element further comprises a collar arranged in the vicinity of an upper circumferential edge of said ventilating container element, wherein said collar protrudes in a direction between upwards, that is vertical, and laterally outwards, that is horizontal, from said ventilating container element.

7. Shoe according to claim 6, wherein said collar is arranged at an upper end of the side wall and extends laterally outwards from the side wall.

8. Shoe according to claim 1, wherein the filler structure or material is open or porous.

9. Shoe according to claim 1, wherein the filler structure or material is discontinuous.

10. Shoe according to claim 1, wherein the filler structure comprises, at least in a portion thereof, a channel structure.

11. Shoe according to claim 1, wherein the sole comprises at least one further sole element.

12. Method for manufacturing a shoe, comprising:
   providing an upper assembly comprising an upper portion having an outer material for surrounding a foot and a lower portion with a breathable, waterproof functional layer laminate having at least a waterproof, breathable membrane,
      wherein the upper assembly comprises an insole and wherein the insole is arranged below the breathable, waterproof functional layer laminate, or
      wherein the bottom functional layer laminate is connected to the outer material and wherein the upper assembly does not contain a separate insole,
   providing a ventilating container element having a bottom part and a side wall surrounding said bottom part so as to form an inner space of the ventilating container element, wherein the ventilating container element is provided with openings in its side wall,
   placing a filler structure or material allowing for air flow through it in the inner space of the ventilating container element, and
   providing an attachment between the side wall of the ventilating container element and the upper assembly,
   wherein the shoe allows for transfer of water vapour from an inside of the shoe to an outside thereof, with water vapour being discharged through the breathable, waterproof functional layer laminate of the lower portion of the upper assembly, through the filler structure or material, and through the ventilating container element.

13. Shoe according to claim 1, wherein the filler structure or material is in the shape of a three dimensional spacer.

14. Shoe comprising:
   an upper assembly comprising an upper portion having an outer material for surrounding a foot and a lower portion, wherein the upper assembly comprises a waterproof, breathable functional layer arrangement extending over the upper portion and the lower portion of the upper assembly, wherein the lower portion of the upper assembly comprises an insole, and wherein the functional layer arrangement is glued to the insole, which is arranged below the functional layer arrangement, via an adhesive; and
   a sole comprising:
      a ventilating container element having a bottom part and a side wall surrounding said bottom part so as to form an inner space of the ventilating container element, the ventilating container element being arranged below and attached to the upper assembly; and
      a filler structure or material allowing for air flow through it placed in the inner space of the ventilating container element.

15. Shoe according to claim 14, wherein the ventilating container element has, at least in a top portion thereof, a smaller perimeter than the lower portion of the upper assembly.

16. Shoe according to claim 14, wherein the ventilating container element is attached to the upper assembly by adhesive.

17. Shoe according to claim 14, wherein the ventilating container element is stitched to the upper assembly.

18. Shoe according to claim 14, wherein the ventilating container element is attached to the upper assembly by a material moulded or injected on parts of the upper assembly and the ventilating container element.

19. Shoe according to claim 14, wherein the ventilating container element further comprises a collar arranged in the vicinity of an upper circumferential edge of said ventilating container element, wherein said collar protrudes in a direction between upwards, that is vertical, and laterally outwards, that is horizontal, from said ventilating container element.

20. Shoe according to claim 19, wherein said collar is arranged at an upper end of the side wall and extends laterally outwards from the side wall.

21. Shoe according to claim 14, wherein the upper portion of the upper assembly comprises a breathable outer material, joined with a breathable, waterproof upper functional layer laminate and wherein the lower portion of the upper assembly comprises a breathable, waterproof bottom functional layer laminate, and wherein a side end area of said bottom functional layer laminate and a lower end area of said upper functional layer laminate are joined to one another, with a waterproof seal being provided at the joint.

22. Shoe according to claim 14, wherein the ventilating container element is provided with openings in its side wall and/or its bottom part or wherein the ventilating container element is, at least in a portion thereof, porous.

23. Shoe according to claim 14, wherein the filler structure or material is open or porous.

24. Shoe according to claim 14, wherein the filler structure or material is in the shape of a three dimensional spacer.

25. Shoe according to claim 14, wherein the filler structure or material is discontinuous.

26. Shoe according to claim 14, wherein the filler structure comprises, at least in a portion thereof, a channel structure.

27. Method for manufacturing a shoe, comprising:
providing an upper assembly comprising an upper portion having an outer material for surrounding a foot and a lower portion, wherein the upper assembly comprises a waterproof, breathable functional layer arrangement extending over the upper portion and the lower portion of the upper assembly,
wherein the lower portion of the upper assembly comprises an insole, and wherein the functional layer arrangement is glued to the insole, which is arranged below the functional layer arrangement, via an adhesive, or
wherein the upper portion of the upper assembly comprises a breathable outer material, joined with a breathable, waterproof upper functional layer laminate and the lower portion of the upper assembly comprises a breathable, waterproof bottom functional layer laminate, wherein a side end area of said bottom functional layer laminate and a lower end area of said upper functional layer laminate are joined to one another, with a waterproof seal being provided at the joint, and wherein the upper assembly does not contain a separate insole;
providing a ventilating container element having a bottom part and a side wall surrounding said bottom part so as to form an inner space of the ventilating container element,
placing a filler structure or material allowing for air flow through it in the inner space of the ventilating container element, and
providing an attachment between the side wall of the ventilating container element and the upper assembly.

28. Shoe comprising:
an upper assembly comprising an upper portion having an outer material for surrounding a foot and a lower portion, wherein the upper assembly comprises a waterproof, breathable functional layer arrangement extending over the upper portion and the lower portion of the upper assembly, with the upper portion of the upper assembly comprising a breathable outer material, joined with a breathable, waterproof upper functional layer laminate and with the lower portion of the upper assembly comprising a breathable, waterproof bottom functional layer laminate, and with a side end area of said bottom functional layer laminate and a lower end area of said upper functional layer laminate being joined to one another, with a waterproof seal being provided at the joint, and wherein the bottom functional layer laminate functions as an insole of the upper assembly and the upper assembly does not contain a separate insole; and
a sole comprising:
a ventilating container element having a bottom part and a side wall surrounding said bottom part so as to form an inner space of the ventilating container element, the ventilating container element being arranged below and attached to the upper assembly; and
a filler structure or material allowing for air flow through it placed in the inner space of the ventilating container element.

29. Shoe according to claim 28, wherein the ventilating container element has, at least in a top portion thereof, a smaller perimeter than the lower portion of the upper assembly.

30. Shoe according to claim 28, wherein the ventilating container element is attached to the upper assembly by adhesive.

31. Shoe according to claim 28, wherein the ventilating container element is stitched to the upper assembly.

32. Shoe according to claim 28, wherein the ventilating container element is attached to the upper assembly by a material moulded or injected on parts of the upper assembly and the ventilating container element.

33. Shoe according to claim 28, wherein the ventilating container element further comprises a collar arranged in the vicinity of an upper circumferential edge of said ventilating container element, wherein said collar protrudes in a direction between upwards, that is vertical, and laterally outwards, that is horizontal, from said ventilating container element.

34. Shoe according to claim 33, wherein said collar is arranged at an upper end of the side wall and extends laterally outwards from the side wall.

35. Shoe according to claim 28, wherein the ventilating container element is provided with openings in its side wall and/or its bottom part or wherein the ventilating container element is, at least in a portion thereof, porous.

36. Shoe according to claim 28, wherein the filler structure or material is open or porous.

37. Shoe according to claim 28, wherein the filler structure or material is in the shape of a three dimensional spacer.

38. Shoe according to claim 28, wherein the filler structure or material is discontinuous.

39. Shoe according to claim 28, wherein the filler structure comprises, at least in a portion thereof, a channel structure.

40. Shoe according to claim 28, wherein said waterproof seal is provided by a material moulded or injected onto the upper assembly at least in an area of the joint or wherein said waterproof seal is provided by glue applied for attaching the sole to the upper assembly or wherein said waterproof seal is provided by a seam tape.

41. Shoe comprising:
an upper assembly comprising an upper portion having an outer material for surrounding a foot and a lower portion having a breathable, waterproof functional layer laminate having at least a waterproof, breathable membrane, wherein the breathable, waterproof functional layer laminate is connected to the outer material and the lower portion of the upper assembly does not have an insole in addition to the breathable, waterproof functional layer laminate; and
a sole comprising:
a ventilating container element having a bottom part and a side wall surrounding said bottom part so as to form an inner space of the ventilating container element, the ventilating container element being arranged below and attached to the upper assembly; and
a filler structure or material allowing for air flow through it placed in the inner space of the ventilating container element,
wherein the ventilating container element is provided with openings in its side wall, and
wherein the shoe allows for transfer of water vapour from an inside of the shoe to an outside thereof, with water vapour being discharged through the breathable, waterproof functional layer laminate of the lower portion of the upper assembly, through the filler structure or material, and through the ventilating container element.

42. Shoe according to claim 41, wherein the ventilating container element has, at least in a top portion thereof, a smaller perimeter than the lower portion of the upper assembly.

43. Shoe according to claim 41, wherein the ventilating container element is attached to the upper assembly by adhesive.

44. Shoe according to claim 1, wherein the ventilating container element is stitched to the upper assembly.

45. Shoe according to claim 41, wherein the ventilating container element is attached to the upper assembly by a material moulded or injected on parts of the upper assembly and the ventilating container element.

46. Shoe according to claim 41, wherein the ventilating container element further comprises a collar arranged in the vicinity of an upper circumferential edge of said ventilating container element, wherein said collar protrudes in a direction between upwards, that is vertical, and laterally outwards, that is horizontal, from said ventilating container element.

47. Shoe according to claim 46, wherein said collar is arranged at an upper end of the side wall and extends laterally outwards from the side wall.

48. Shoe according to claim 41, wherein the filler structure or material is open or porous.

49. Shoe according to claim 41, wherein the filler structure or material is discontinuous.

50. Shoe according to claim 41, wherein the filler structure comprises, at least in a portion thereof, a channel structure.

51. Shoe according to claim 41, wherein the sole comprises at least one further sole element.

52. Shoe according to claim 41, wherein the filler structure or material is in the shape of a three dimensional spacer.

53. Shoe according to claim 21, wherein said waterproof seal is provided by a material moulded or injected onto the upper assembly at least in an area of the joint or wherein said waterproof seal is provided by glue applied for attaching the sole to the upper assembly or wherein said waterproof seal is provided by a seam tape.

\* \* \* \* \*